United States Patent
Bailey, III

(10) Patent No.: US 6,353,661 B1
(45) Date of Patent: Mar. 5, 2002

(54) NETWORK AND COMMUNICATION ACCESS SYSTEMS

(76) Inventor: John Edson Bailey, III, 4558 Rockmart Hwy., Silver Creek, GA (US) 30173

(*) Notice: Subject to any disclaimer, the term of this patent is extended or adjusted under 35 U.S.C. 154(b) by 0 days.

(21) Appl. No.: 08/993,452

(22) Filed: Dec. 18, 1997

(51) Int. Cl.[7] .......................................... H04M 11/00
(52) U.S. Cl. ............................ 379/93.25; 379/90.01; 379/88.17
(58) Field of Search ..................... 379/90.01, 93.01, 379/93.05–93.09, 93.12–93.31, 93.37, 110.01, 387, 900, 88.22, 88.17; 455/422–426

(56) References Cited

U.S. PATENT DOCUMENTS

| 5,761,280 A | * | 6/1998 | Noonen et al. ........... 379/93.27 |
| 5,764,910 A | * | 6/1998 | Shachar |
| 5,809,415 A | * | 9/1998 | Rossmann ................. 455/422 |
| 5,915,001 A | * | 6/1999 | Uppaluru ................. 379/88.22 |
| 5,923,736 A | * | 7/1999 | Shacher ................... 379/90.01 |
| 5,937,041 A | * | 8/1999 | Cardillo, IV et al. .... 379/90.01 |

* cited by examiner

Primary Examiner—Wing F. Chan
(74) Attorney, Agent, or Firm—Needle & Rosenberg, P.C.

(57) ABSTRACT

System for using a telephone or other such audio device to interact with various remote systems. The present invention provides systems which combine the power, flexibility, and access to information and communications of the Internet with the simplicity, reliability and wide availability of the existing telephone system. Using conventional phone technology, users of the systems of the invention can browse, search, store, and create information stored on, for example, the Internet in Hypertext Transport Protocol (http) format, communicate using Simple Mail Transport Protocol (SMTP) and Post Office Protocol 3 (POP3) email formats, and to manage attempts by others to contact them through the telephone system. Additional devices for interacting with these systems are also described.

32 Claims, 31 Drawing Sheets

NETWORK AND COMMUNICATION ACCESS SYSTEMS

BACKGROUND OF THE INVENTION

1. Field of the Invention

The present invention generally relates to a method and system for combining the power, flexibility, and access to information and communications of the Internet with the simplicity, reliability and wide availability of the existing plain old telephone system (POTS). More specifically the invention allows persons using conventional phone technology to browse, search, store, and create information stored on the Internet in Hypertext Transport Protocol (http) format, communicate using Simple Mail Transport Protocol (SMTP) and Post Office Protocol 3 (POP3) email formats, and to manage attempts by others to contact them through the telephone system.

2. Background

The access to information and communications, provided by the Internet, has fueled its explosive growth. Email creates world wide, virtually instantaneous messaging. Documents and messages that would previously have been sent via postal mail, over night delivery, or facsimile can be sent via email. The World Wide Web has proven to be an amazing means of delivering information. News, weather, sports and all types of commercial information are available 24 hours a day, 7 days a week. Many services allow users to personalize the information that is delivered. Search engines allow people to track down the significant as well as the obscure in seconds. The powers of these technologies encourage all types of organizations to put their information into http format. However, security concerns have slowed the spread of electronic commerce over the Internet, but only by comparison to the explosive growth of email and information delivery.

The facts surrounding the growth of the Internet are exceeded only by the projections of its future growth. As of mid 1997, surveyors found that approximately 50% of businesses within the United States have an Internet presence. Internet access has jumped from between 30 and 40 million people to 80 million. These same organizations forecast that by the year 2001 between 200 and 300 million people will have Internet access. Over 30% of U.S. households have a computer. 10% of those households have more than one computer.

Yet there are limits to the growth of the Internet and the access to information that it provides. Many people lack the skills and inclinations needed to access the Internet. Many people lack the technological skills needed. On a wider scale, many more lack knowledge of the English language in which most Internet content is written. For many, literacy itself is a barrier to access. Costs also are a barrier. The equipment to obtain Internet access runs from the hundreds to the thousands of dollars. Plus there are monthly charges.

The consequences of these barriers are the other side of the explosive growth figures. While anywhere from 20 to 40% of the U.S. population have or will have Internet access. 60 to 80% either do not or will not have access. Similarly while 50% of all U.S. businesses have web sites, 50% don't have them. Outside of the United States both consumer and business participation are much lower. In some developing countries the figures are probably under 1%. These barriers tend to focus the Internet towards the technology oriented concerns of the businesses and users that have fueled its growth.

What is needed is a means for combining the power, flexibility, and access to information and communications of the Internet with the simplicity, reliability and wide availability of the existing plain old telephone system (POTS). Such a system would provide a techno-equalizer for people and businesses without Internet access. It also encourages further the explosive growth of the Internet. There would be a direct route to all consumer and businesses, world wide, having access to the Internet and to sophisticated messaging and communication services. With a universal audience, business and non-commercial entities would have a compelling rationale for deploying both their information resources and access to their products and services through Internet protocols.

For all its possible benefits, providing Internet access via POTS and conventional telephone equipment creates multiple problems. The first problem is voice itself. A computer screen is a random access device. You can quickly scan the screen and focus at any point that interests you. Voice, on the other hand, is a serial medium. It has a very limited "view" and it is difficult to "scan" ahead. Many systems such as those at movie theatres do not allow user input. The message is played and the user must listen until he/she hears the entire message or gets to the information desired. Responding to voice systems is generally time consuming as well. Menu items are constructed for non-users. They are "friendly," with pleasant greetings, detailed explanations, and numerically keyed menus.

The telephone is also a very limited input device with only 12 keys. Phones with the keypad on the handset, such a slim line, cordless and cellular versions, make listening and responding even more difficult. Last, but not least, many functions require entering long account numbers and then verifying those account numbers with a personal identification number (PIN) number. Unless those numbers are used very frequently the user must carry some kind of listing of the numbers. That creates the possibilities of losing the record, not having the listing when it is needed, or both. If the listing is lost, the users account may be exposed to fraudulent use. If the listing is not available, the service is also not available.

The telephone system itself has limited features. New features come slowly, especially when considered in light of the explosive growth of Internet services. Even today access control is very limited. A user can obtain an unlisted number, obtain caller id service and a caller id device, or use an answering machine to control access. All of these devices have distinct drawbacks. The unlisted number prevents anyone without the number from contacting the user, even if the user would welcome the contact. Many times the number is compromised and the user must go to the trouble and expense of changing the number. Only to have it compromised again. Caller id, especially the version that provides the name to which the phone is listed, is helpful. However if a user has multiple phones and/or cordless phones, the devices have limited usefulness. In addition, callers can have their name and number blocked. Screening calls through an answering machine result in numerous inconveniences.

Most telephone switches, both Telephone Company and private branch exchange (PBX), are based on proprietary architectures. This makes them both expensive and difficult to add value to.

SUMMARY OF THE INVENTION

With these drawbacks in mind, the present invention provides a surprisingly effective system which combines the benefits of the Internet and POTS, and eliminates or avoids these drawbacks. The system of the invention must be accessible by both conventional phones and by inexpensive, enhanced devices. It must also optimize both the information and the choices presented to users and the ways in which they respond of those choices. Access to user's and their personal information must be both rapid and secure, a difficult combination. Finally the system must be inexpensive.

The present invention provides a method and system for allowing devices using voice and Dual Tone Multi-Frequency (DTMF) tones to connect, through the system to the Internet. This connection can be used to access, store and create http compatible information. The same connection can be used for messaging and interactive communication. In the preferred embodiment, the system can be used to manage and control attempts to contact the user for the purpose of interactive communication.

Given a Uniform Resource Locator (See http://www.imc.org/Searchablelrfc1738) (URL), the system obtains the information available at that URL using the http mechanism. A URL is a compact string representation of the location for a resource that is available via the Internet. Once the information is obtained the system presents the information to the user by transforming the downloaded text into speech in a manner emulating the behavior of a web browser. In a referred embodiment, the user possesses an enhanced device that allows the user to rapidly navigate both the current web page and the Internet generally. There are a variety of enhanced devices described herein. In general those devices allow the user to overcome the limitations of voice technologies. A number of alternative input means are presented, including the use of a conventional phone.

The system presents several alternative means of allowing the user to select an alternative, "click". In the preferred embodiment, one or more audio cues inform the user that the material being presented is an alternative on which he/she may act. The audio cues may vary to indicate to the user the type of alternative that is being presented. The user may "click" by touching a key on the telephone keypad, using a "voice mouse", or with a "click on sound."

If the user finds information, which he/she wishes to store, the system allows the user to store the information or the location of the information. He/she can later access that information via the mechanisms described herein.

The system can also be used to create content that is subsequently stored in http format. The user navigates to the location that he/she wishes to modify using the mechanisms described above. Once at that location the user can add, replace, store, or delete existing content. New or replacement content can be added by voice, digitally stored or recognized, text entry, facsimile, or information stored via the mechanism described above. Links to other http content can also be created.

A similar mechanism exists for access to message. The system obtains the user's messaging address. The user's messages are accessed. If any new messages have arrived, the user is informed of the number of messages. The user may then access his/her messages, both new and old, send or reply to messages, and manage existing messages. The system also allows non-users of the system to send and receive email from one or more system users.

An alternative embodiment allows the user to initiate an email messaging session with a user unknown to him/her, based upon that user having identified him/herself as being members of a category. The user's contact is given an identifier. That identifier serves as the basis for replying, through the system, to that user. Members of the category may reply to the user through the use of the identifier. If the category member wishes to also be anonymous, his/her reply is also assigned an identifier. That identifier is used by the system as the basis for processing messages by the original sender to that user. An indefinite number of messages may be processed in this way until one or both parties decide to shed their anonymity or cease the messaging process.

The user may also communicate interactively and/or control attempts by others to communicate with him/her. In the preferred embodiment users wishing to control contact attempts enable a contact suppression device which monitors contact attempts. Only contact attempts processed through the system are allowed to reach the user. This forces persons attempting to contact the user to use the system. The system has the capability of processing user defined contact attempt rules. Those rules allow the user to selectively permit, restrict, or act upon contact attempts.

To effectively overcome the limitations of the voice medium, the system must possess and track information about the user and his/her preferences. To maintain this information the system must have a mechanism for identifying users. Receiving stations obtain the user's identity, the name of the system capable of authenticating the user's identity and the user's authentication. If the user's identity is not maintained on the local system, the receiving system attempts to locate the system capable of authenticating the user. If the address of that system is not contained on the receiving system, the receiving system attempts to locate it by contacting a master system that maintains the addresses of all systems of its type. Once the address is obtained the information is passed to the system capable of authenticating the user. The user's identity is obtained and the received authentication is checked against the stored authentication. A number of error conditions are possible. The master system may be unknown, the master system may not know the received authenticating system, and the received authentication may not match the stored authentication. In all of these error conditions, an error is returned and the user is allowed access using the default user profile.

To speed this process, the preferred embodiment utilizes an auto connection device. Auto connection allows a user to transmit his or her identity and authentication automatically upon the initiation of a contact attempt. An example would be a device outwardly resembling a telephone. Upon lifting the handset, the device transmits the identity and authentication. This requires that the auto connection device store information necessary for authentication. Upon receiving a signal, such as the handset being lifted, the device transmits the information to the receiving station. In one alternative, this device stores a code indicating success or failure in creating a connection. The contact suppression device, described above, can permit communication when the authentication system is unavailable.

To secure this process, the preferred embodiment allow the employment of a security device. This device can contain one or more encryption keys that can be used to encrypt the information sent to the authentication system. In the preferred embodiment, the authentication system creates a temporary key, which is used to encrypt the session's transmissions.

All of these identification mechanisms exist in order to make available information about the user and his/her preferences. Once a user has been identified, user information is loaded which allows the system to present optimized alternatives to the user. In a further alternative, the system can obtain information about the user's location, contact means, date/time, etc. That information can be used to modify the choices presented to the user in light of the exigent circumstances.

The system also maintains the user's preferences for information delivery. Based upon those preferences, information searches are conducted to obtain information that is most likely to be of interest to the user.

All of the user's choices are monitored. The user's preferences are modified in light of his/her actions. Thus the user's preference are adapted to the user's on-going behavior patterns. The recording of the user's decisions allow the system to create personal information categories for the user. Those categories and their rankings in user preference are the basis for obtaining information to present to the user and the order in which that information is presented.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE PREFERRED EMBODIMENTS

Figure 1:
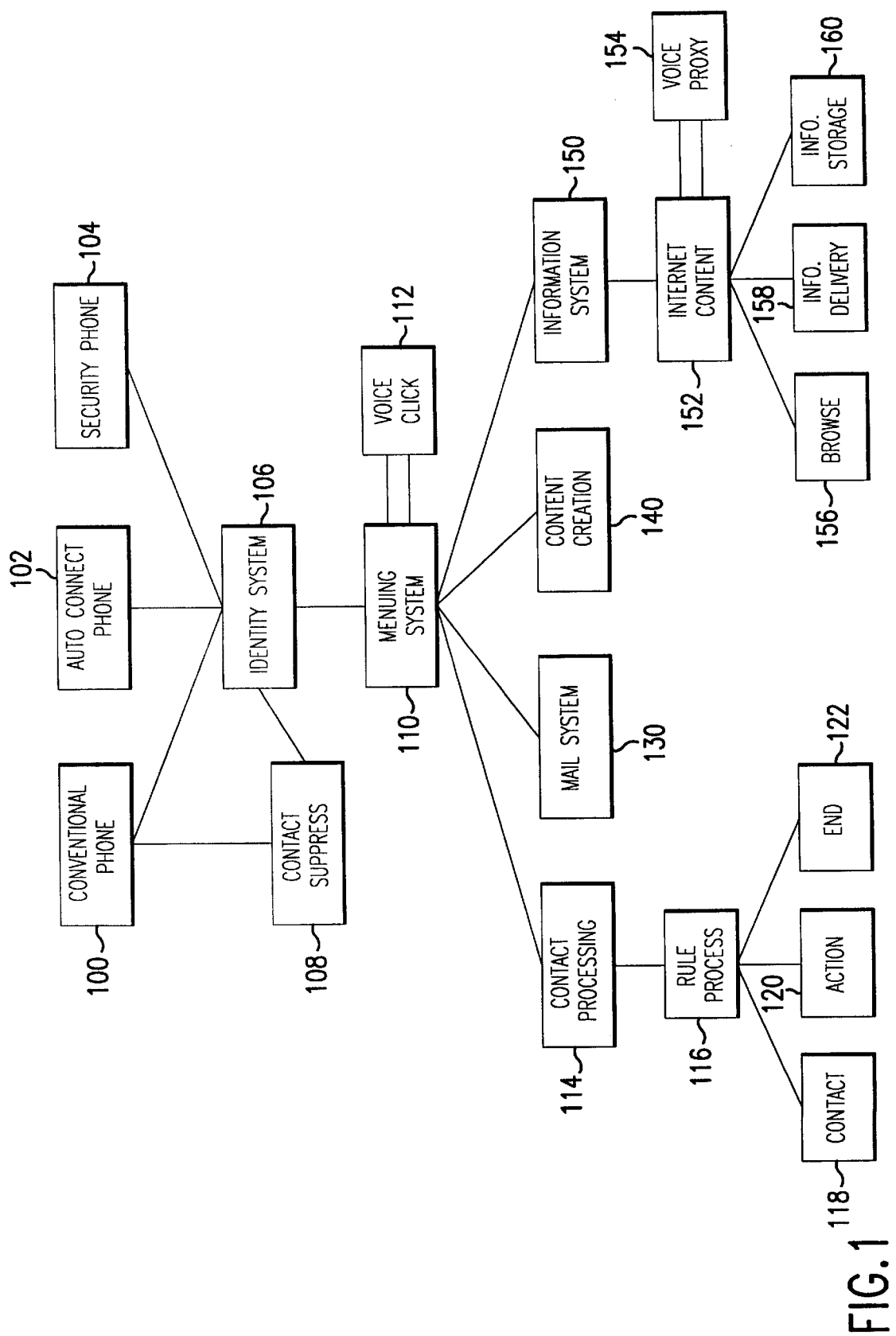
FIG. 1 is a block diagram of an access system utilizing the present invention.

The present invention may be understood more readily by reference to the following detailed description of preferred embodiments of the invention and to the accompanying Figures.

Before the present articles and methods are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

Throughout this application, where publications are referenced, the disclosures of these publications in their entireties are hereby incorporated by reference into this application in order to more fully describe the state of the art to which this invention pertains.

Overview

The present invention provides a system for navigating content (e.g., text, images, sound recordings, and other material that could reside on a network such as the internet) residing on a server using a telephone. The system operates using a communication network. One of skill in the art would recognize that are many types of communication networks suitable for the operation of the presently described system. For instance, the communication network described herein can be the internet, or a local area network, a network connected with telephone switching systems and individual telephone lines, or simple electrical connections between the components. In addition, for the purposes of the present invention, it is possible that two or more of the components of the system could reside in an integral unit, connected only be short electrical signal pathways. The system also includes a telephone in communication with the communication network. The telephone can be a POTS telephone, or can be a device operable over a telephone line. The telephone includes means for transmitting at least one audible navigation signal. Suitable such means include a microphone and speaker combination, as well as other sound generating devices. In addition, the telephone includes a means for receiving at least one audible content signal. Again, for a POTS telephone, this receiving means is an amplifier connected to the earpiece speaker, but other devices are contemplated. For instance, a speech to text converter could operate as the receiving means, processing the incoming signals (assuming they are spoken words) and displaying the text on a monitor or other such device. The system further includes a server including a database for storing content. For instance, the server can be represented by a web site with local storage (memory, hard disk) for HTML content files. Finally, the system includes a processing means in communication with the database on the server and the communication network. The processing means can be a computer operating based on a computer program, an electronic device having a computer program and a microprocessor for carrying out the program embedded thereon, or other similar devices. The processing means performs several steps. First, the processing means is responsible for receiving from the communication network the at least one audible navigation signal. For instance, the processing means can simply receive electrical impulses over the communication network from the telephone where the pulses correspond in an analog or digital fashion to the voice of the user of the telephone. Such signals would be considered audible signals. In addition, for the present system, the signal corresponds to a navigation signal. Using the internet paradigm, the navigation signals can include those commands found in a standard internet web browser and the like. After the processing means receives the signal, it is decoded and, in accordance with the navigation signal, the content is accessed from the database on the server. This access, again, can take place remotely such as over the internet. Based on the content that is accessed, the processing means then generates at least one audible content signal corresponding to the accessed content. For instance, if the content is a digital audio sound file, then the processing means would simply generate audible signals corresponding to the digital information. The process is similar for other types of content. For instance, textual content might require text to speech processing using, for example, a voice synthesizer or similar device. Finally, the processing means transmits over the communication network the at least one audible content signal to the receiving means of the telephone.

In a preferred embodiment, the communication network supports the HTTP protocol. However, one of ordinary skill in the art would recognize that other protocols and network configurations are readily suitable for the present systems and such protocols are meant to be included within the scope of this application.

In a further embodiment, the content is textual content. In an alternate embodiment, the content is a hypertext document, such as an HTML document.

As described above, for a textual document, in one embodiment, the generating step further comprises converting the textual content to speech.

During delivery of the content to the telephone, if the content includes hyperlinks, then the system further includes, in the processing means, means which is responsive to the user sending a navigation signal corresponding, for example, to an instruction to follow the hyperlink. This means, upon receipt of the selected at least one audible navigation signal, generates at least one audible hyperlink signal corresponding to a hyperlink to additional content. The signal then causes the system to access additional content on a server on the communication network.

The navigation signals useful for the system include signals requesting that content be "replayed". Thus, for the system, the at least one audible navigation signal corresponds to a request to replay the content. This system comprises means for retransmitting the at least one audible content signal over the communication network to the receiving means of the telephone. Similarly, in another embodiment, the at least one audible navigation signal corresponds to a request to halt delivery of the content, and the system further comprises means for halting the transmission over the communication network of the at least one audible content signal to the receiving means of the telephone. In yet another embodiment, analogous to a command to skip content, the halting system is extended to include means for resuming the transmission over the communication network of a subsequent portion of the at least one audible content signal to the receiving means of the telephone.

The content can correspond to user selectable options (such a menu choices and the like).

In one embodiment of the system, the at least one audible navigation signal is a DTMF tone.

In other embodiments, the telephone can be specially equipped, including at least one key which corresponds to a selected navigation command. In a further embodiment, the telephone further comprises means for generating an audible navigation signal corresponding to the presence of the at least one key.

In a further embodiment, the content on the server further comprises user designated information. In a further embodiment of this system, the system further comprises a database for storing records corresponding to the user designated information. This system also includes means for retrieving a record from the database and, based upon the retrieved record, generating at least one signal corresponding to the retrieved user designated information. Suitable retrieving means include computer software capable of formulating and carrying out a query of the database and reporting the results of the query.

Using this system, users can store links to additional content, particular "favorite" navigation commands and the like.

The invention also provides a novel device for carrying out the content navigation as described above. The device is a modified telephone as described above, where the telephone further comprises at least one key which corresponds to a selected navigation command. As used herein, the term "key" is meant to encompass a touchpad button or similar actuable device associated with the telephone. In this embodiment, the system further comprises a visually perceptible display having at least one display portion associated with each of the at least one keys. Thus, for each key, there is a display portion, and the system includes a means for displaying, on the visually perceptible display, selected text and/or images corresponding to the user designated information. Thus, if the user designated information is, for example, a navigation command to go "back" to previously reviewed content, then the displaying means could show on the display the word "back", an icon representing the same, or a combination thereof.

In a further embodiment, a further device is provided for generating the audible navigation signal. For instance, a hand-held device with a speaker could be suitable. The device includes a switch in communication with a means for generating an audible navigation signal, whereby actuation of the switch causes the generation of the selected audible navigation signal. The generating means can include a tone generating circuit in connection with a speaker, or similar such means. In a preferred embodiment, the generated signal is a DTMF tone. In another embodiment, the audible navigation signal corresponds to a command to navigate through the content in a continuous fashion, a stepped fashion, or a combination thereof Thus, the device could be used for basic web browsing functionality.

In an alternate embodiment, the processing means further comprises means for determining whether the at least one audible navigation signal exceeds a predetermined volume level and, if so, forwarding the at least one audible navigation signal to the accessing means. Such means can include a microphone which generates an electrical signal and a circuit for measuring the magnitude of the signal and determining whether the magnitude exceeds a predetermined threshold level (e.g., whether the signal is above a certain voltage).

In a further embodiment, the invention includes a further system for navigating content residing on a server using a telephone. This system includes a communication network and a telephone in communication with the communication network, wherein the telephone for comprises means for transmitting an audible signal to the communication network and means for receiving an audible signal from the communication network. In addition, this system includes a server including a database for storing content. Furthermore, the system includes a navigation device for generating a plurality of DTMF tones in communication with the telephone. The navigation device includes one or more keys corresponding to navigation commands. The device also includes a database for storing a unique plurality of DTMF tones corresponding to each of the one or more keys, and processing means for, upon operation of a selected one of the one or more keys by a user, performing various steps. These steps include accessing the database and generating audible navigation signals corresponding to the unique plurality of DTMF tones corresponding to the selected key. In addition, the system includes means for transmitting the audible navigation signals over the communication network by transmitting the audible navigation signals to the telephone. Finally, the system includes a processing means in communication with the database on the server and the communication network for performing the steps of receiving from the communication network the audible navigation signals. In addition the processing means also performs other steps, including the steps of, in accordance with the navigation signals, accessing the database for storing content on the server, generating at least one audible content signal corresponding to the content, and transmitting over the communication network the at least one audible content signal to the telephone.

In a further embodiment, the device further comprises means for generating a unique plurality of DTMF tones corresponding to the presence of the device. Such means can include an electronic circuit in connection with a speaker. In this system, the processing means further comprises means for receiving the DTMF tones corresponding to the presence of the device and means for modifying the database of the navigation device. Thus, if the device is present, the keys are automatically assigned meanings from the database.

In a further embodiment, the present invention includes a system for verifying the identity of an entity whose authentication information is stored on an unknown remote computer. This system includes a communication network and receiving means, in communication with the communication network, for receiving a entity's identity information. Thus, when a user attempts to log on to the system, the identity of the logging on party is received by the receiving means. This is accomplished using a means, in communication with the communication network, for sending the entity's identity information, via the communication network, to the receiving means. In addition, the system also includes at least one verification system in communication with the communication network and the receiving means, wherein the at least one verification system has a processing means. The processing means of the verification systems perform the steps of querying each of the at least one verification systems for the existence of the entity's identity information thereon. Thus, the system searches to determine whether it can verify the identity of the entity. If so, upon finding a selected verification system having the entity's identity information thereon, the identity of the entity is verified and a signal is generated corresponding to the verification. In a preferred embodiment, the system operates in real time.

In a further embodiment, each of the at least one verification system further comprises a database for storing information about the entity. In yet another embodiment, the sending and receiving means are operable upon audible signals, such as DTMF tones.

In still another embodiment, the sending means is actuated upon receipt of a predetermined actuation signal. In one embodiment, the actuation signal corresponds to the initiation of a telephonic connection. In a further embodiment, the receiving means further comprises means for generating a success signal based on the receipt of the predetermined actuation signal. In this embodiment, the sending means further comprises means for determining whether the success signal has been received thereon, and means for, in the absence of the success signal, generating a signal corresponding to an error condition associated with the sending means. All of these means can be accomplished using a programmable computer and associated signal generation hardware readily known to one of ordinary skill in the art.

In yet another embodiment, the system further comprises means for encrypting the information prior to sending the entity identity information over the communication network to the receiving means. For instance, any of the known cryptographic systems can be implemented in conjunction with the system for any of the signals being transmitted along the communication network. Where encryption occurs, of course, the system also includes appropriate means for decrypting the entity identity information from the communication network prior to receiving the information at the receiving means.

In a further embodiment, the system further comprises a device capable of storing a verification system identity signal corresponding to the system capable of verifying the information. In this embodiment, the sending means further comprises means for transmitting the system identity signal to the receiving means and wherein the at least one verification system corresponds to the system matching the verification system identity signal. In one embodiment, this device is portable, such as a key or data card. Where a key or data card is used, the sending means can further comprise means for accepting the key or data card. Similarly, the system can also include means for detecting the insertion of the key and wherein the sending means is operable in response to the detecting means.

In a further embodiment, the present invention provides a system for conducting electronic mail transactions using a telephone. The system includes a communication network and an electronic mail server on the communication network. The mail server is of the typical type and includes a database of electronic mail messages. In addition, the system includes a telephone in communication with the communication network, wherein the telephone comprises means for transmitting at least one audible electronic mail manipulation signal over the communication network. In addition, the system includes a processing means in communication with the electronic mail server and the communication network for performing various steps. These steps include receiving the at least one audible electronic mail manipulation signal from the communication network and, in accordance with the electronic mail manipulation signal, accessing the database of electronic mail messages. Further steps include, generating at least one audible electronic mail message signal corresponding to the accessed electronic mail message from the database and transmitting the at least one audible electronic mail message signal to the telephone over the communication network.

In a further embodiment, the at least one audible electronic mail manipulation signal is a DTMF tone or a voice signal. In another embodiment, the electronic mail server is operable using the SMTP and POP3 protocols. However, one of ordinary skill in the art would recognize that numerous other protocols could be used.

In a further embodiment, the database of electronic mail messages comprise electronic mail records comprising a subject portion and a body portion, where either or both of subject or body portion are digital recordings of audio information. In this case, the system further comprises means for transmitting the digital recording to the telephone.

In yet another embodiment, the at least one audible electronic mail manipulation signal is a voice. In this embodiment, the processing means also includes means for recognizing the voice and accessing the database of electronic mail messages in accordance with the recognized electronic mail signal, whereby a recognized electronic mail manipulation signal is generated. Suitable voice recognition systems are known to those of ordinary skill in the art.

In a further embodiment, the system further comprises means for digitally recording a voice and storing the digitally recorded voice in the subject or body portion of an electronic mail message residing on the server.

In another embodiment, the system further comprises means for notifying a receiving party upon receipt of an electronic mail message by the server. Such notification means can be an audio tone or recording that is played to the receiving party, or can be a pager or other such device.

In a further embodiment, the processing means is operable only when the user of the system is identified.

In yet another embodiment, the telephone is associated with a selected telephone number. In this embodiment, system also includes means for determining the telephone number of the telephone (for instance, a "caller-id" unit) and determining whether the telephone number is authorized (by accessing an authorized telephone number database or the like). In a preferred embodiment, the processing means is operable only when telephone number is authorized.

In a further embodiment, the present invention provides a system for processing a contact attempt by a contacting party to contact a user. This system includes a communication network and a database for storing a list of users and a list of rules for allowing contact with the users. The rules can be stored as tokenized logical operations, or in any other suitable format. The system also includes means for sending contact initiation signals over the communication network, wherein the contact initiation signals comprise signals corresponding to the identity of the user being contacted. In addition, the system includes a processing means in communication with the communication network and the database for performing the steps of receiving the contact initiation signals, in accordance with the contact initiation signals, searching the user list of the database, upon finding the user in the database, determining whether contact should be initiated in accordance with the list of rules for allowing contact with the user being contacted;, and, in accordance with the determination, generating a signal corresponding to whether the contact attempt should be permitted.

In yet another embodiment, the processing means further comprises means for, upon not finding the user in the database, generating a signal corresponding to denial of the contact attempt. The denial signal can include a warning sound or similar notification to the user.

In a further embodiment, the processing means further comprises means for querying the contacting party for additional contact initiation signals and wherein the means for determining further comprises means for determining whether contact should be initiated in accordance with the additional contact initiation signals. Thus, if the identity of the user is in doubt, the system can ask the user to input additional identification information or the like so as to verify the permissibility of permitting contact initiation.

The present invention also provides the above system, where each of the list of rules for each selected user corresponds to the states of routing the contact request to the contacted party, terminating the contact request, or processing the next available rule in the list of rules for the selected user.

In another embodiment, the rules comprises logic responsive to the date, time, identity of the contacting party, location of the contacting party, or a combination thereof.

In a still further embodiment, the contacting party is a computer system whose contact attempt is based upon a predetermined schedule.

The present invention also provides a system for restricting access to a communications device to entities possessing the proper access code for operation of the device, the system comprising a communication network, and a device in communication with the communication network, wherein the device further comprises means for enabling or disabling operation of the device. This system further includes means, in communication with the communication network, for generating signals corresponding to an access code for operation of the device, means for receiving one or more access code signals from the communication network wherein the access code signals correspond to access codes for operation of the device, a database for storing valid access codes for operation of the device, and processing means in communication with the receiving means, the database, and the communication network. The processing means is capable of performing the steps of receiving over the communication network the signal corresponding to the access code for operating the device, querying the database for the valid access code for operation of the device, and, based upon the result of the database querying, comparing the valid access code with the received access code and operating the enabling or disabling means to thereby permit or deny operation of the communications device over the communication network.

In a further embodiment, the processing means further comprises means for, based upon the result of the database querying, transmitting a signal corresponding to an error condition to the entity over the communication network. In yet another embodiment, the access code signals are DTMF tones and the error condition signals are voice signals. In another embodiment, the system further comprises means for examining the error condition signal and, in the event of the existence of a selected error condition signal, for actuating the means for enabling or disabling the device, to thereby disable the device.

The system also can further comprise means for initiating contact with a system on the communication network having the proper access code and means for determining the failure of the contact initiation and, in the event of the failure of the contact initiation, for actuating the means for enabling or disabling the device, to thereby disable the device.

In another embodiment, the invention provides a system for caching content residing on a server using a telephone. This system includes a communication network, a telephone in communication with the communication network, wherein the telephone comprises means for transmitting at least one audible content request signal, a server including a database for storing textual content and a digitized synthesized vocal reproduction of the textual content, processing means in communication with the server and the communication network for performing the steps of receiving the at least one audible content request signal from the communication network, in accordance with the content request signal, querying the database on the server for the requested the textual content, upon finding the requested textual content in the database, generating at least one audible voice content signal corresponding to the digitized synthesized vocal reproduction of the textual content, and transmitting the at least one audible content signal to the telephone using the communication network.

In another embodiment, the system includes a database for storing user identities and user languages and wherein the processing means further comprises means for determining the selected language of the user by querying the database, and wherein the digitized synthesized vocal reproduction is in the selected language.

In yet another embodiment, the invention provides a system for adaptively presenting options to a user and determining the option chosen using a telephone, the system comprising a communication network, a telephone in communication with the communication network, wherein the telephone comprises means for transmitting at least one user response signal over the communication network, a database for storing the identity of the user and a list of actions available to the user, and a processing means. The processing means is in communication with the communication network and the database and is capable of performing the steps of retrieving from the database the list of actions available to the user, sorting the list of actions, generating, in order, audible option signals corresponding to each of the items in the list of actions, and transmitting the audible option signals to the telephone over the communication network. Finally, this system includes a means for receiving the user response signal from the telephone indicating the user has selected one of the list of actions corresponding to a user choice.

In another embodiment, the system further comprises means for storing the user choices in a historical database and wherein the determining means is responsive to the stored user choices. In yet another embodiment, the system further comprises means for storing the times of the user choices in the historical database and wherein the determining means is further responsive to the stored times. In another embodiment, the determining means is further responsive to a signal generated by the user corresponding to a modification of the ordered options.

In a further embodiment, the system further comprises means for storing the user choices of a plurality of users in a historical database and wherein the determining means is responsive to the combined user choices of the plurality of users. The determining means can be further responsive to the absence from the database of a selected choice by the user.

In addition, in one embodiment, the system includes means for storing expert user choices in a historical database and wherein the determining means is responsive to the stored expert user choices.

In another embodiment, the database further comprises additional information corresponding to the user, such information selected from the group consisting of the day of user interaction, date of user interaction, time of day of user interaction, location from which the user interaction occurred, means by which the user has interacted with the system, and demographic information about the user, and wherein the querying and determining means are further responsive to the additional information.

In yet another embodiment, the invention provides a system for adaptively presenting information to a user using a telephone, the system comprising a communication network, a telephone in communication with the communication network, a database for storing the identity of the user and a list of the types of information to be presented to the user, and processing means in communication with the communication network and the database for performing the steps of retrieving from the database the list of the types of information to be presented to the user, sorting the list of the types of information, generating audible sorted information signals corresponding to sorted information, and transmitting the audible sorted information signals to the telephone over the communication network. In one embodiment, the information is textual and the determining means is responsive to the words contained in the information.

In yet another embodiment, the invention provides a system for intermittently searching information and presenting the results of the search to a user using a telephone, the system comprising a communication network, a telephone in communication with the communication network, wherein the telephone comprises means for transmitting at least one user search signal over the communication network, a database for storing the identity of the user and data about the search the user requested, and processing means in communication with the communication network and the database for performing various steps. The steps can include, at predetermined intervals, querying the database on the server for the data about the search the user requested, based upon the search the user requested, searching at least one additional database for information responsive to the search the user requested, generating signals corresponding to search results, and transmitting the search result signals to a signal processing means. In a further embodiment, the database further comprises information about the previous results of the search request and wherein the determining means is responsive to the information about the previous results. In another embodiment, the data about the search the user requested further comprises a duration for conducting the search. In addition, the signal processing means can comprise means for generating an electronic mail message and sending the message to the user over the communication network. In yet a further embodiment, the signal processing means comprises means for generating an electronic mail message and sending the message over the communication network to the user containing the signals corresponding to the search results.

In another embodiment, the present invention provides a system for storing the location of content, a copy of content, or a combination thereof residing on a server using a telephone, the system comprising a communication network supporting the HTTP protocol, a telephone in communication with the communication network, wherein the telephone comprises means for transmitting at least one audible storage signal over the communication network, a database for storing the location of the content, a copy of the content, or a combination thereof, and processing means in communication with the database and the communication network for performing the steps of receiving the at least one audible storage signal from the communication network, and, in accordance with the storage signal, storing the location of the content, a copy of the content, or a combination thereof in the database. In one embodiment, the audible storage signal is a DTMF tone. In another embodiment, the telephone further comprises means for transmitting at least one audible access signal over the communication network and the processing means further comprises means for receiving from the communication network the at least one audible access signal and means for, in accordance with the at least one audible access signal, retrieving the content information from the database, generating signals corresponding to the retrieved content, and transmitting the signals to the telephone over the communication network.

The present invention also provides a system for storing the location of content, a copy of content, or a combination thereof, the system comprising a communication network, a server including a database for storing content, a content database for storing the location of the content, a copy of the content, or a combination thereof, a rules database for storing user-defined rules corresponding to options for processing the content, and processing means in communication with the communication network and the database for performing the steps of processing the user-defined rules for processing the content in the rules database and, in accordance with the user-defined rules for the processing the content, storing the location of the content, a copy of the content, or a combination thereof in the content database. In a further embodiment, the communication network supports the HTTP protocol.

The present invention also provides a system for creating content using a telephone, the system comprising a communication network supporting the HTTP protocol, a telephone in communication with the communication network, wherein the telephone comprises means for transmitting at least one audible content creation signal over the communication network, a database for storing content, and processing means in communication with the communication network and the database for performing the steps of receiving the at least one audible content creation signal from the communication network, and. in accordance with the content creation signal, creating content accessible to users on the communication network and storing the created content in the database. In still another embodiment, the audible content creation signal is a DTMF tone. In a further embodiment, the created content comprises digitized vocal information. In yet another embodiment, the telephone further comprises means for transmitting at least one audible content editing signal over the communication network and wherein the processing means further comprises means for receiving the at least one audible content editing signal from the communication network and for modifying the database.

In another embodiment, the invention provides the navigation system described above wherein the content further comprises at least one user notification portion and wherein the processing means further comprises means for generating at least one audible signal corresponding to the at least one user notification portion.

In a further embodiment of the electronic mail system, the system is adapted for allowing anonymous messaging between a contacting party and a plurality of contacted parties wherein the plurality of contacted parties are defined as members of a group. In this embodiment, system further comprising a database for storing a list of group member for each of a plurality of groups, a database for storing a unique identifier corresponding to the identity of the contacting party, and processing means in communications with the electronic mail server, the group membership database, the identifier database, and the communications network, for performing the steps of accessing the identifier database and retrieving a unique identifier corresponding to the identity of the contacting party, accessing the membership database and retrieving a list of members for a selected group, generating at least one electronic mail manipulations signal, wherein the at least one signal comprises a signal to send an electronic mail message to each of the list of members, and transmitting the at least one send signal to the electronic mails server over the communications network, whereby the members of the groups being contacted are unaware of the actual identity of the contacting party.

In yet another embodiment, the invention provides a system for recording on a remote system actions taken by a user using a network browser, the system comprising a communication network, and a network browser in communication with the communication network, wherein the browser further comprises means for generating at least one navigation signal, means for transmitting the at least one navigation signal over the communication network, means for generating a user identification signal, and means for transmitting the user identification signal over the communication network. In addition, the system includes a database for storing user identification signals and navigation signals, and at least one remote processing means in communication with the communication network, the database, and the browser, for performing the steps of receiving a user identification signal from the browser via the communication network, receiving at least one navigation signal from the browser via the communication network, and storing in the database the user identification signal and the at least one navigation signal. In a further embodiment, the communication network supports the HTTP protocol. In yet another embodiment, the browser further comprises means for generating and transmitting over the communication network a signal corresponding to the success or failure of the at least one navigation signal, and wherein the database further stores signals corresponding to the success for failure of the at least one navigation signal, and wherein the at least one processing means further comprises means for receiving the success or failure signal and storing the success or failure signal in the database. In still another embodiment, the browser further comprises means for generating and transmitting over the communication network at least one signal corresponding to content being reviewed, and wherein the database further stores signals corresponding to content, and wherein the at least one processing means further comprises means for receiving the content signals and storing the content signals in the database.

In the foregoing overview, where a means is described, such means is, where not otherwise specified, by default accomplished and embodied using a microprocessor and a computer program.

Description of Subsystems

Turning to the figures, the method and system of the present invention will now be described in detail. The method of the present invention implements a system by which users may create, access, and store information; send and receive email; and conduct and manage interactive communications on a world wide basis.

In a preferred embodiment of the present invention, the user connects to the system automatically and securely through a voice device. That connection allows the system to obtain the user's preferences. Those preferences, along with information the system has on the user's current situation, allow the system to create a set of menu choices adapted to the user's situation and preferences. The choices are presented to the user via the means of a voice click. The user also has an enhanced device that allows one touch entry of user choices. Based on the user's choices, the system allows the user to perform all of the actions described above.

To clarify the meaning of the terms used above, as used herein they mean as follows. A user may be a person, an entity such as a business, or a device acting for a business or individual. Individual persons may be acting in a business or personal capacity. A connection exists when a user has made contact with a local access point, normally via a voice device. A voice device is a device capable of transmitting voice and DTMF tones to a local access point. Preferences are information about users used by the system to facilitate the user completing his/her desired tasks. Situational information is information available to the system to determine if the system contains information about the situation in general or about the current user's setting for the situation that would provide an improved set of choices to be presented to the user. Such information could include, but is not limited to the time, day of the week, month, and year, location from which called (if available). A choice is a point wherein the operation of the system creates a situation in which a user response will result in a action being performed. A menu is a set of choices to which a user may respond. A voice click is a user response to a choice. The voice click emulates the click event present in the Internet browser paradigm. A variety of specific mechanisms are presented. One touch operation is a mechanism by which a series of actions are collapsed into a single operation. An example is clicking on a link in an Internet browser. Instead of having to type in a URL, the browser accesses the URL. One touch operation is especially important in a voice environment wherein the input options are limited. Enhanced devices are devices which take advantage of the system's information about user preferences to create one touch entries and overcome, to a certain extent, the limitations of the voice input mode.

This invention allows inexpensive devices to provide a single point of access to all of a user's information and communication needs. This invention combines the simplicity and wide availability of POTS and existing telephone equipment with the access to information and communications of the Internet. The system combines the ability to access, store, and create information on the World Wide Web using, in one embodiment, the http format as well as communicate using the Internet or other email protocols such as the SMTP, POP3, and IMAP4 protocols. While the invention is described broadly in terms of these presently utilized protocols, applicant does not wish the scope of the claims to be limited to any particular protocol. Instead, where terms such as "http" and "tcp/ip" and the like are used herein, and especially in the claims, those terms are meant to be inclusive of present or future protocols which are functionally similar or equivalent to the named protocols.

A very high degree of security is available to user's having the need or preference for that security. At the same time the system is available using conventional touch-tone phone virtually anywhere in the world.

System Overview

An overview of the system is contained in FIG. 1. To solve the problems outlined in the introduction, a number of components work together. Access can be gained to the system by a means of conventional phones, wired, cordless, wireless 100, by auto connect phone 102, and by security phones 104. All of these devices connect to the identity system 106, which contains user identities and authentications as well as information used by the menuing system 110, the contact processing system 114, the mail system 130, the content creation system 140, and the information system 150. The contact suppress device 108, allows users to force persons to contact them through the system in order to use its sophisticated contact management system.

The actual delivery of services occurs through the information, mail, contact processing and content creation modules. However the limitations of voice and POTS require the system to do much more work. The key is storing and using information about the user and his/her situation. With this knowledge, the user does not have to wade through a time consuming serial menu system. Instead the first choice presented is likely to be the user's first choice. The voice click (FIG. 19) presentation format also reduces the time consumed in presenting menu options. The first step in acquiring and maintaining such information is being able to identify the user. The identity system (FIG. 9) handles this task. The auto connection (FIG. 10) feature makes this process virtually instantaneous. The security system (FIG. 11) protects the sophisticated knowledge of the individual developed by this system. The adaptive and situational menuing systems and the adaptive information system (FIGS. 19–22) transform the data into the choices actually presented to the user. Given this sophisticated system of delivering choices and information to the user, many tasks can be handled with a conventional phone. The device enhancements (FIGS. 5–8) provide more control and data entry capabilities. Finally the contact suppress device (FIG. 17) controls access to the user. The user can then use the contact processing features of the system (FIG. 16) to control access and to provide features for parties attempting to make contact. Thus while many of these features have some value as separate components, together they are required to allow the telephone to serve as a single access point for access to information and communications.

Users accessing the system can use a conventional phone 100, an auto connect device 102, or a security device 104. The system can use caller id to speed connection for users calling from their home or place of business. For a single user, with low security concerns, caller id may be sufficient authentication. For multiple users, accessing from a single line or pool of lines, the auto connect device automatically connects and authenticates the caller. For users with more security concerns the security device accomplishes the same task, but is capable of accepting a separate physical key and can conduct the session using more secure means. The identity system 106 allows a user to connect from any place having a system access point. If the local access point does not possess the user's identity and authentication information, it locates the system having that information in order to obtain the identity and conduct the authentication. From that remote system the local access point can then obtain the user's other information for the other systems described below. Non users can also connect to the system as guests. However their access may be more limited and less convenient.

Once connected, the menuing system uses the user's profile information is obtained from a storage location obtained from the identity subsystem server containing the user's authentication information. The contents of the user's profile depend on the nature of the contact means and system utilization of the user. Detailed information concerning specific items contained within the user's profile is described below. The information from the profile can be used to present the user with a personalized set of choices, optimized to the user's situation and past choices. The voice click subsystem (FIG. 19) and the enhanced access devices also facilitate user access.

Figure 18:
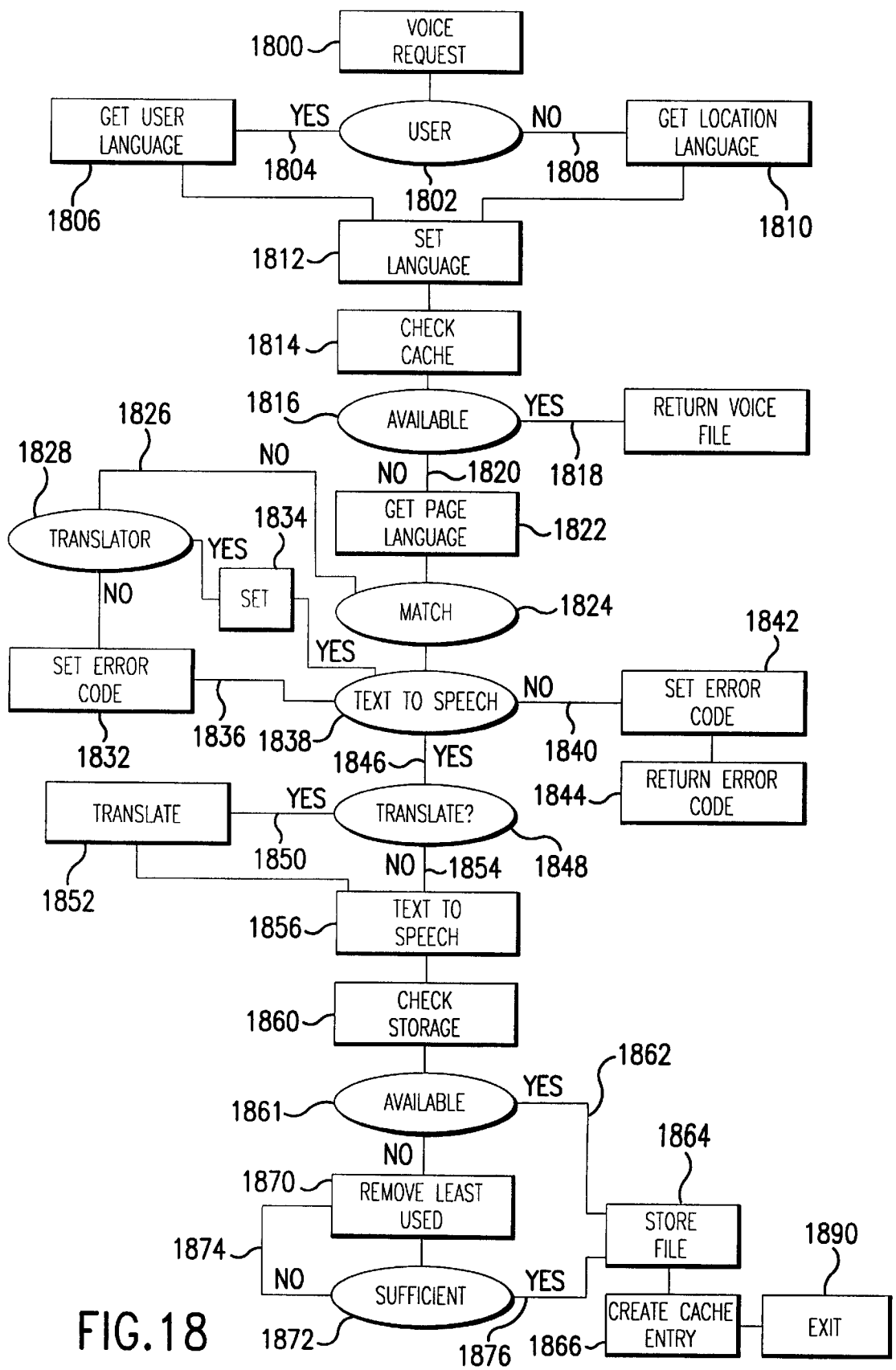
FIG. 18 is a flow chart describing the method by which text to speech resources are adapted to provide users information in their preferred language and by which those resources may be conserved.

The information system 150 uses an Internet browser paradigm adapted to the voice environment to allow users to browse through the information 152 obtained from the Internet. The adaptive information and menuing systems contained in FIGS. 19,20, 21, and 22 maximize the value of the information being presented 158. In either case, users can store information for later access 160. The system allows users to customize conventional phones to speed their access. It also supports enhanced devices that mirror, even more closely, the Internet browser paradigm 100, 102, 104. The voice proxy subsystem, described in FIG. 18, 154 conserves currently scarce text to speech resources as well as creating the opportunity for cross language access.

The mail system 130 uses the Internet mail client paradigm, again adapted to the voice environment, to allow users to send and receive email. The system supports email to persons without conventional email accounts as well as to non-users. It also supports non-users both sending and receiving email. Enhanced devices make access easier and more productive.

The contact processing system allows users to have a high decree of control over by whom and when they are contacted. The contact suppress device 108 allows users to, at their option, direct persons wishing to contact them to make their contact attempts through the system. The contact processing system uses rules that the user establishes and information from the identity system to process attempts by users or non-users to contact them. Depending on the outcome of the rule processing 116, contact attempts may be allowed 118, terminated 122, or result in some other outcome, such as messaging 120.

The content creation system 140 allows users to create and maintain Internet and system accessible content using inexpensive devices, 100, 102, 104, as well as facsimile machines.

Method Overview

Figure 2:
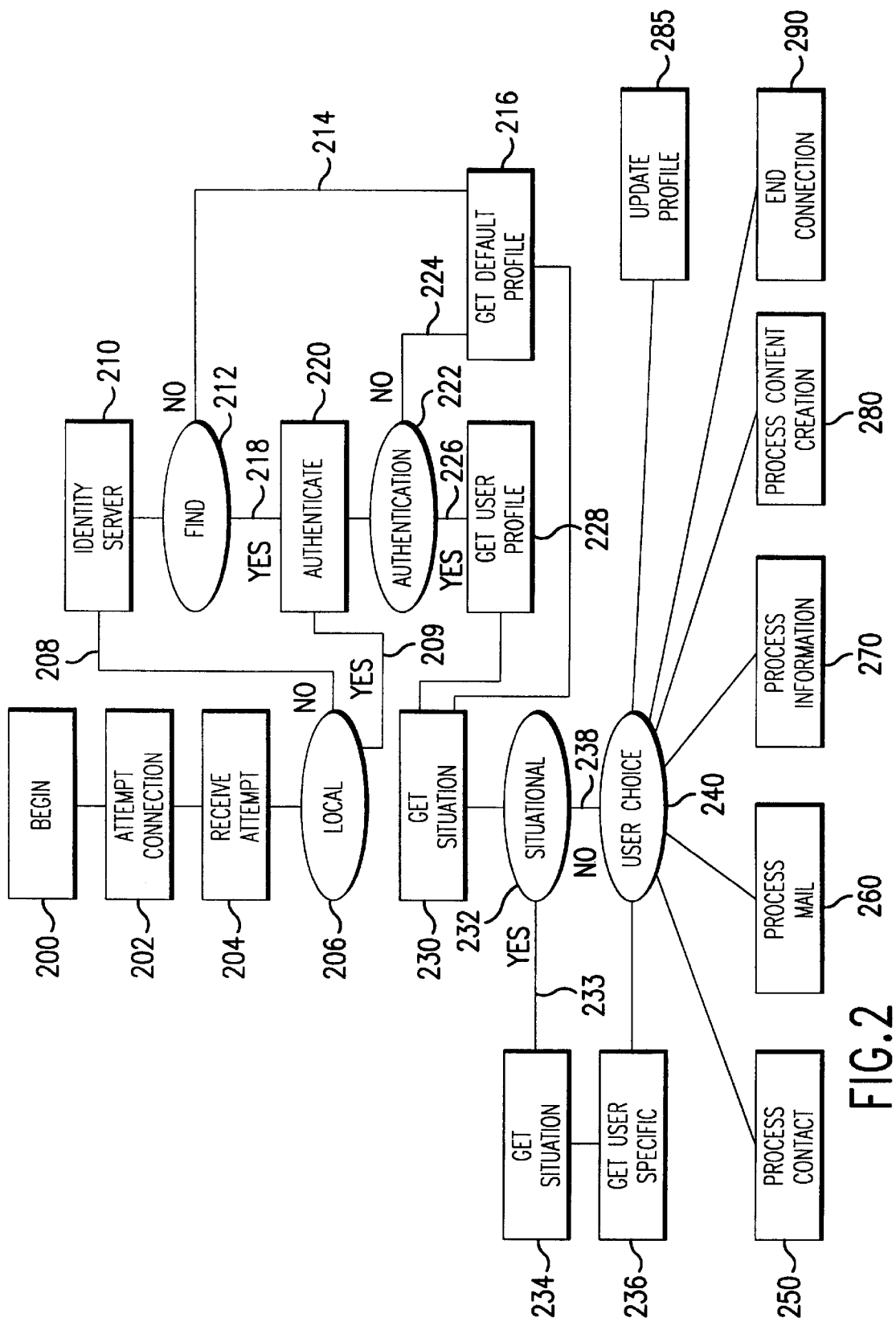
FIGS. 2 and 2a are flow chart showing all procedures used in the preferred embodiment of he present invention.
Figure 2A:
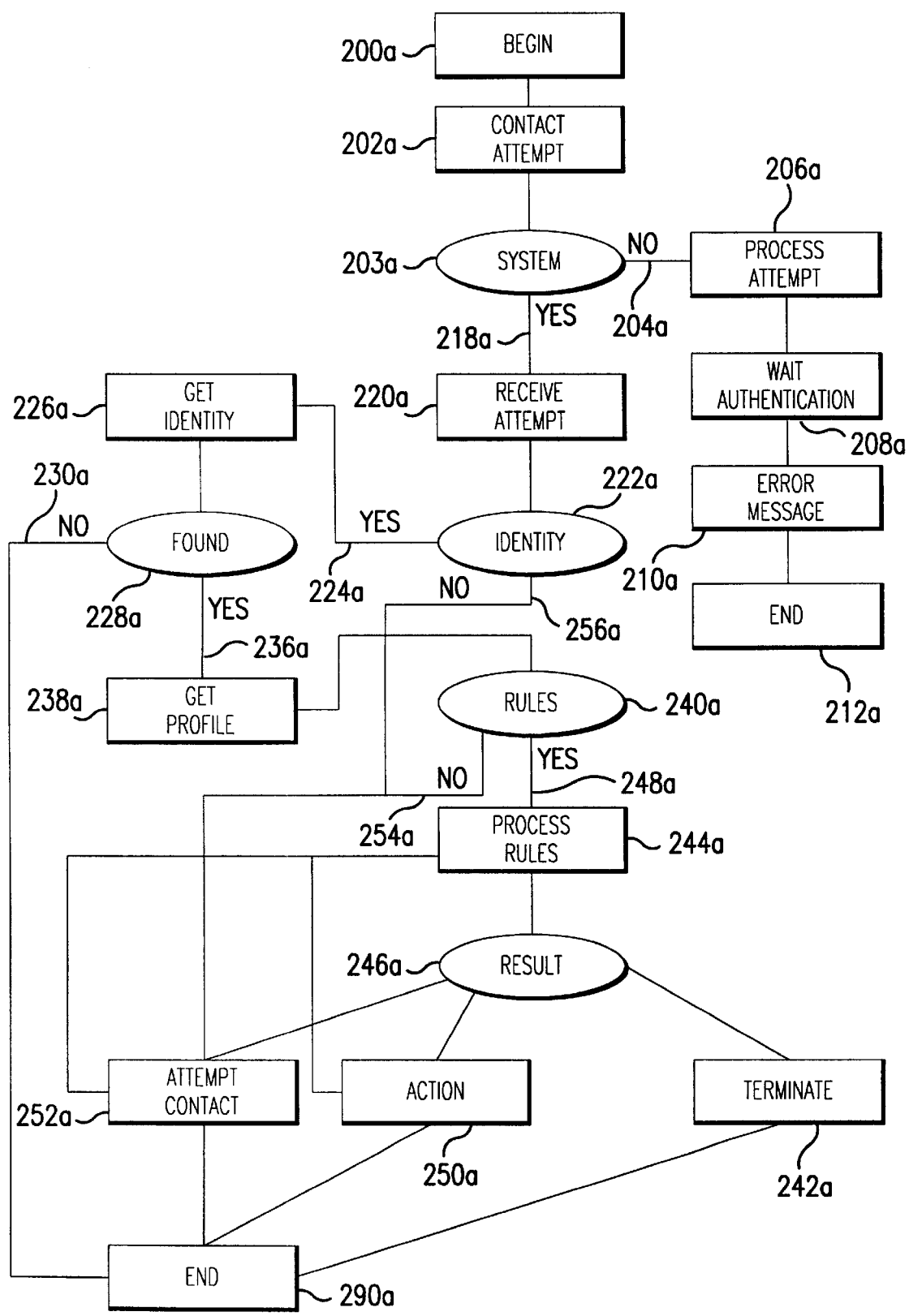

Further details of the preferred embodiment are presented in FIG. 2a. The process begins at 200. A user attempts to connect to the system using either and auto connect device (FIG. 10) or a security device (FIG. 11). Those devices automatically transmit the identity, the identity server and the authentication to the system 202. The receiving system 204 determines if it is the identity server 206. If it is not the identity server 208, it attempts to locate the user's identity server 210. Once that process is complete 212, if the user's identity server is unavailable 214, the user is connected using the system's default profile 216. If the identity server is located 218, or if the receiving system is the identity server 219, the identity server is contacted to get the user's authentication 220. A connection is made to the server 222. If the user can not be authenticated 224, the default profile is obtained 216. If the user can be authenticated 226, the user's profile is obtained 228. In either case the user's situational information is obtained 230. If the situation information and the profile, default or user 232, indicate that situation specific choices should be added to the user's profile choices 233, the situational information is obtained 234, and choices specific to the situation are obtained 236. Once the situational processing is completed, or if no situational choices are added 238, or content created 280, or end 290, then the user is presented 240 with his/her choices. From that point the user may chose to attempt a contact 250, send/receive mail 260, receive information 270, or create content 280. The user's choices are recorded and his/her profile updated 285.

Figure 19:
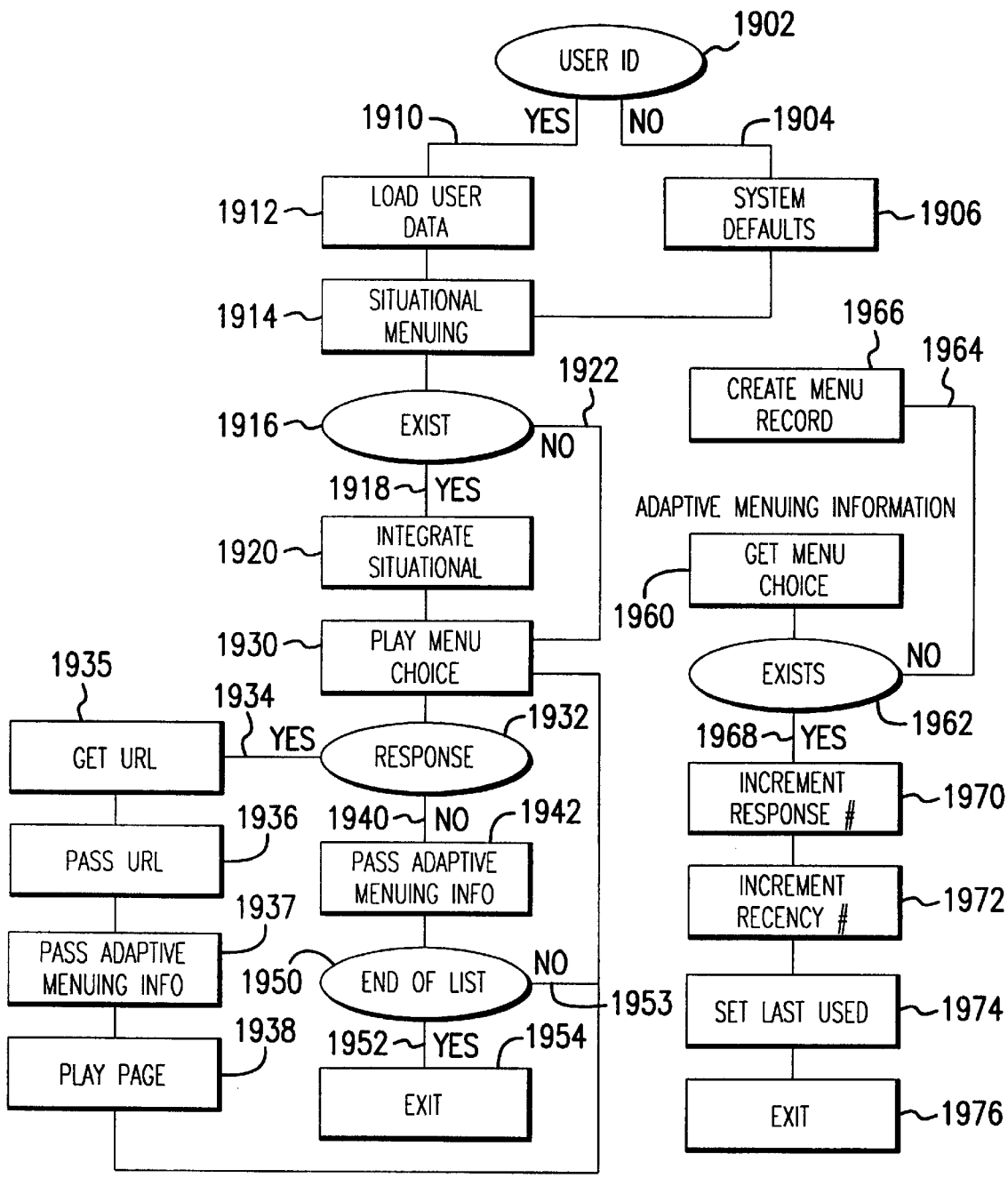
FIG. 19 is a flow chart describing the method by which a user's personalized choices are obtained.

FIG. 2b also illustrates the process that occurs when a third party attempts to contact a user. The process begins at 200a. A party attempts to contact a user 202a. If the party's contact attempt 203a is not through the system 204a, the contact suppression subsystem (FIG. 17) opens a communication session 206a. It waits authentication 208a. Failing to receive a system authentication, it delivers an error message 210a, and the process exits 212a. Should a contacting party be able to provide a system authentication, the contact attempt is processed as in 252a. If the contact attempt is made through the system 218a, the receiving system 220a determines if the contact attempt required identity information to process 222a. If an identity contact is desired 224a, an attempt is made to locate the identity 226a (FIG. 19). If the identity search results 228a are negative 230a, the process exits 290a. If the identity is obtained 236a, the user profile is obtained 238a. If the user profile 240a has rules 242a, the rules are processed 244a. Based upon the outcome of the rule processing 246a, the contact attempt may be terminated 248a, an action may result 250a, or a contact attempt may be made 252a. A contact attempt will also be made if there are no contact rules 254a, or if no identity is required 256a. The process ends at 290a.

Connection Subsystem

The Connection subsystem, shown in FIG. 1–8, provides much of the functionality of an Internet browser, such as those created by Netscape and Microsoft, within the limitations of voice transmission, DTMF (touch-tone) responses, and existing telephone equipment. Within these limitations users can move around the Internet with similar capabilities to computer users using the text only mode of their browsers.

Figure 3:
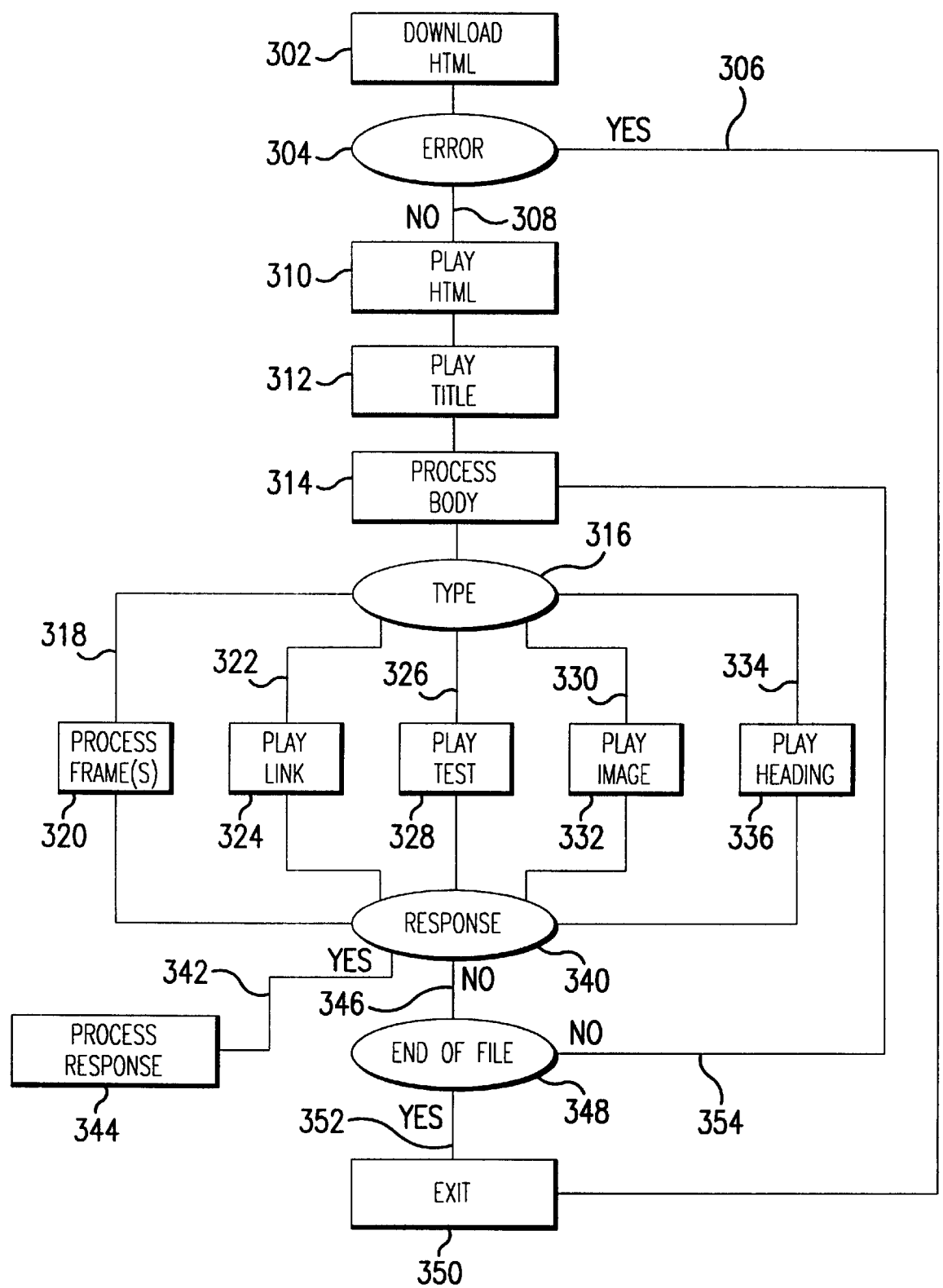
FIG. 3 is a flow chart describing the method of playing content organized used the http paradigm in a voice format.

As seen in FIG. 1 the system uses information stored in http format, see (http://www.w3.org/pub/WWW/protocols/HTTP/HTTP2.html). The method of user response, step 402. In step 404, the response is processed. Depending upon the system settings the response may be processed in a number of ways. In one embodiment, the digit one, branch 406, is treated as the Scroll up event. The point of execution 314 in FIG. 3 is moved up a specified amount 408. In step 410, it is determined if the beginning of the content has been reached. If the "no" branch 412 is taken the process exits 490 and processing of the HTML resumes at that point. If the "yes" branch 414 is taken the systems determines whether a previously accessed page (Back) exists 416. If a page exists, the "yes" branch 418, the contents of that page are obtained 419 and the process of FIG. 3 occurs. If no prior page exists, the "no" branch 420, the contents of the Home page are obtained 422 and the process of FIG. 3 occurs 490. If the digit zero was received, branch 430, the step 432 is executed and a Scroll Down event occurs. The point of execution 314 of FIG. 3 is moved down a specified amount. If the movement of 432 does not result 433 in the end of the content being reached 433, the "no" branch 434 occurs and the processing of the HTML resumes at that point. If the end of the content is reached 438, the system determines if a previously accessed page (Forward) exists 440. If a previously accessed page exists 442, the contents of that page are obtained 443 and the process of FIG. 3 occurs 490. If no previously accessed page exists, branch 444, the action is discarded and the process exits 490. If the star "*" tone occurs, the branch 450 is taken. The playing of the current text is aborted 452. The process resumes at step 346 of FIG. 3 490. If the digits 2 through 9 are obtained, branch 460, the system determines 461 if an alpha numeric processing option is in effect 462. If the "yes" branch 463 is taken, the value is passed to the process 464. If the "no" branch is taken 465, the click event is generated 466 and the process resumes at 478. If the pound sign "#" tone occurs, the branch 474 is taken. The system determines 476 if a command or link has been entered 478. If the "yes" branch 480 is taken, the relative or absolute address is obtained 486 and the process of FIG. 3 occurs 490. If the "no" branch 482 is taken, a page containing other command options is obtained 484 and the process of FIG. 3 occurs 490.

Figure 4:
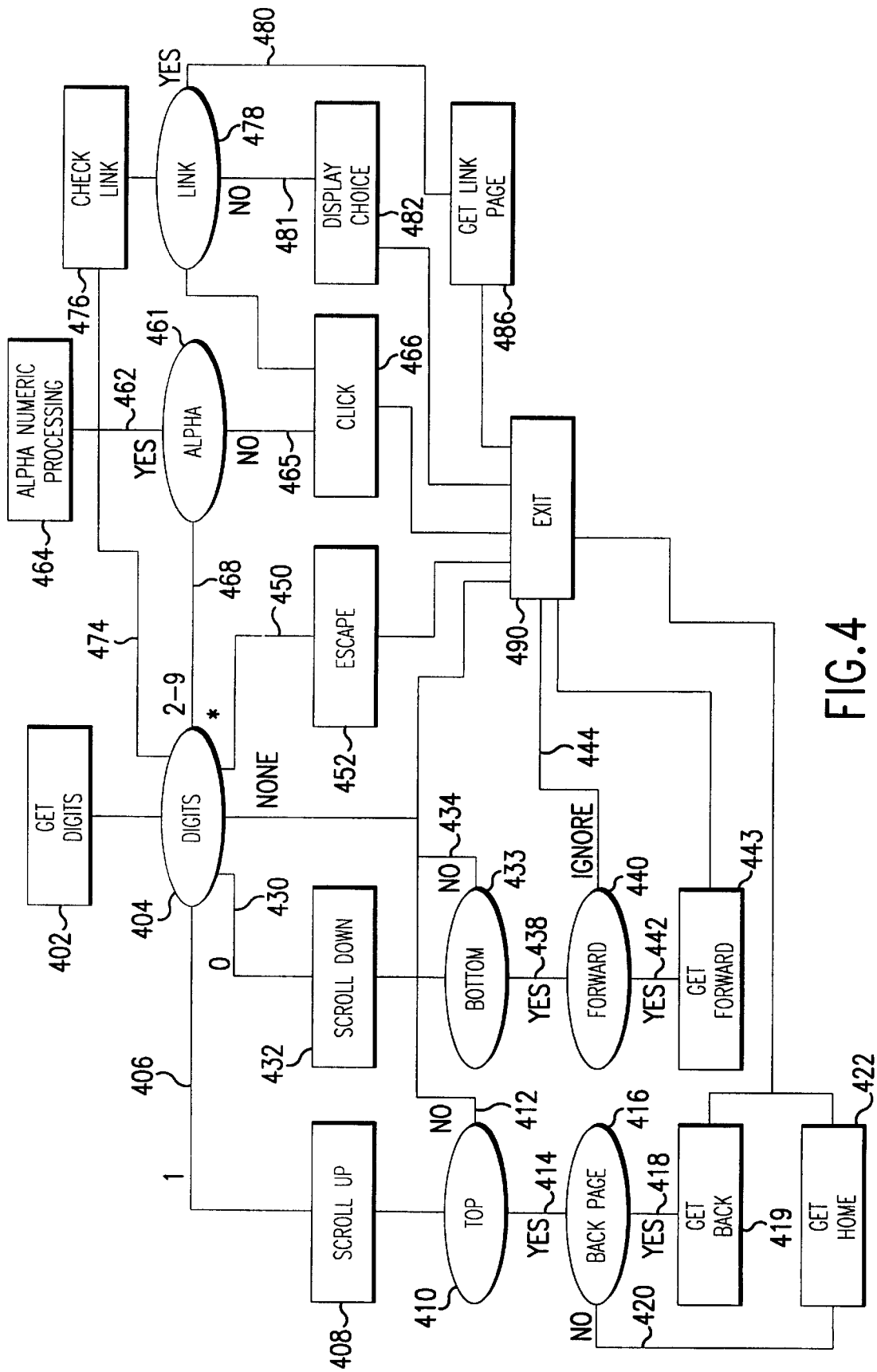
FIG. 4 is a flow chart describing the method by which a user can control the playing of http content via a device employing DTMF (touch-tones).
Figure 5:
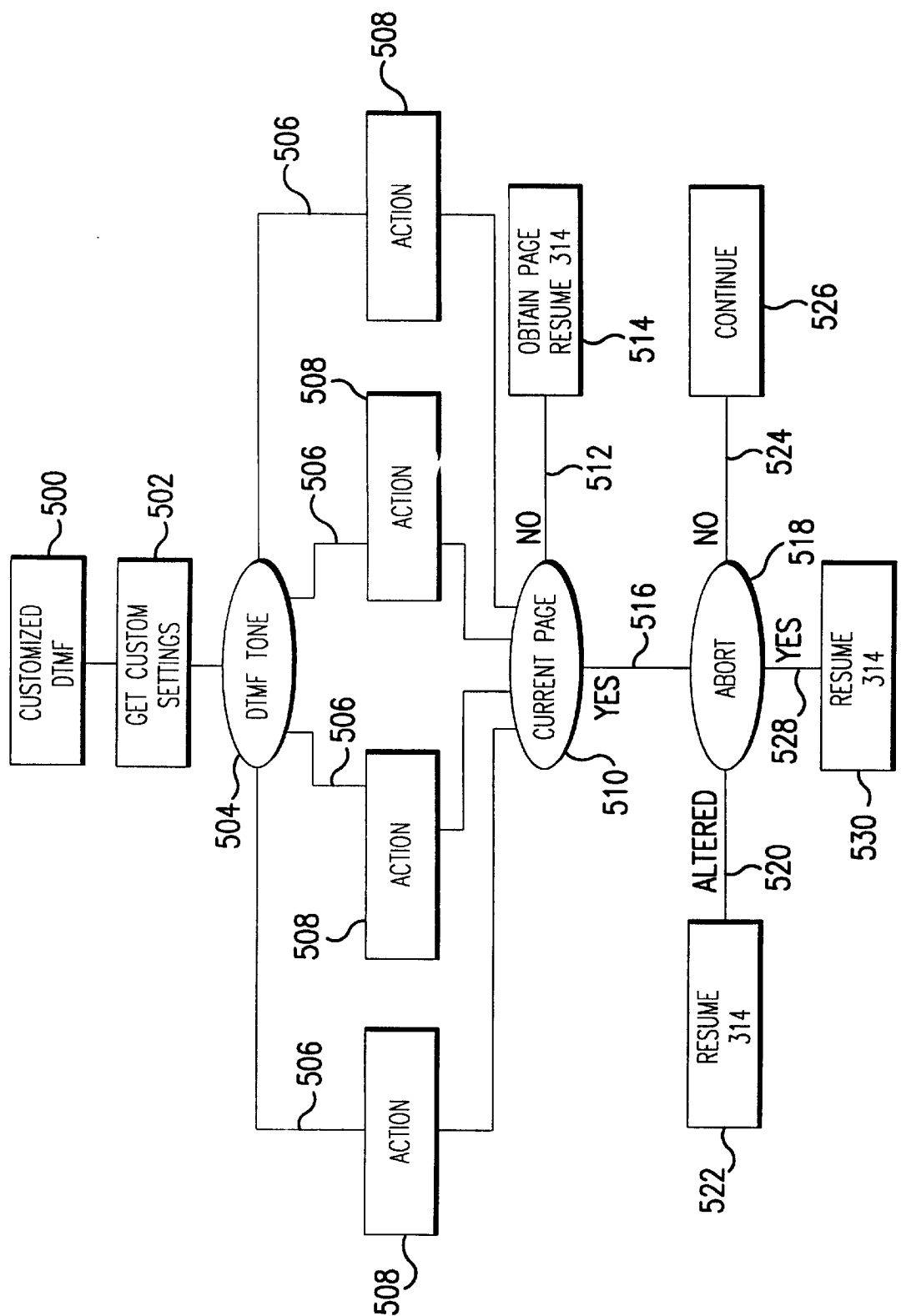
FIG. 5 is a flow chart describing the method by which a user can control the system via the customized use of the keys of a standard device employing DTMF (touchtones).
Figure 27:
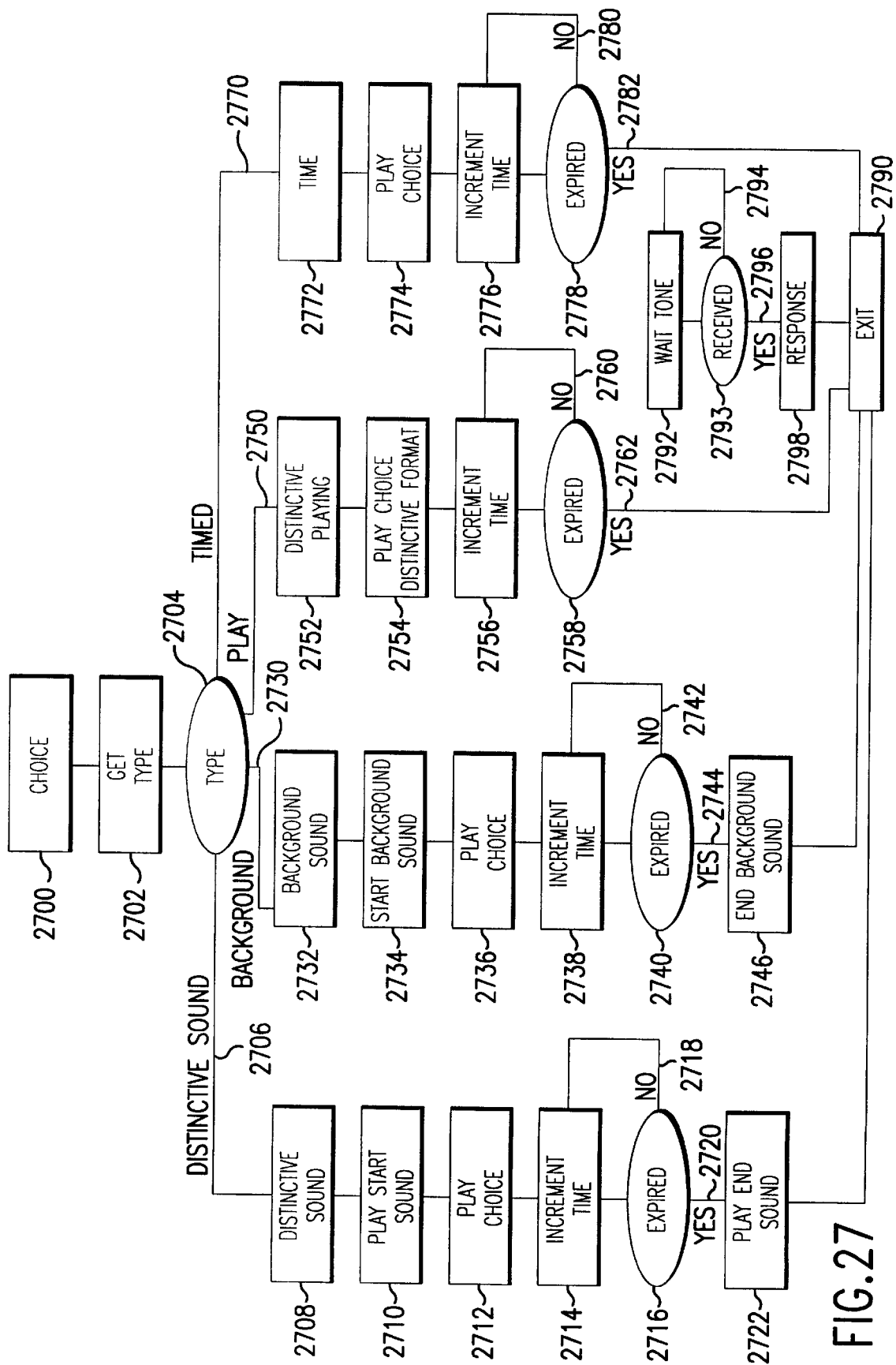
FIG. 27 is a flow chart describing the method by which a user can be informed that a choice is being presented.

One of skill in the art would recognize that other mappings are possible. implementing the connection subsystem is shown in FIG. 2 at 270 is further described in FIG. 3. The method begins at 300. Given a URL at step 302 the content is obtained from the source in HTML, see above, format. The http process has a built in mechanism for attempting to recover from errors. If the http process can not recover from an error in the download, step 304, the process branches 306, and exits the process at step 390. If the download is completed successfully, the process continues, step 308. The downloaded HTML content is analyzed, step 310 to obtain the elements contained within it. In step 312 the title of the page is converted from text to speech and played. The method proceeds to 314 wherein the next element within the HTML file is obtained. At step 316 the method branches based upon the type of element obtained. If the element contains an HTML Frame, branch 318 is followed. At step 320 the contents of the frame are converted to speech and played. If the element contains a link to other HTML content, also called an anchor, branch 322 is taken (see also FIGS. 4 and 27). At step 324 the text accompanying the link is converted to speech and played. If the element contains material not otherwise identified, plain text, branch 326 is taken. The text is converted to speech and played in step 328. If the element contains an image, branch 330 is taken. If the image has an associated text alternative (ALT), the associated text is converted to speech and played at step 332. If the element is a heading, branch 334 is taken. The associated text is converted to speech and played 336. The system monitors user responses 340. Should a user response occur, branch 342 is taken. The system processes the user response in step 344 as shown in FIG. 4. If no user response has occurred, branch 346 is taken. At step 348, it is determined whether more HTML content exists. If it is determined that no more content exists, the system follows the "yes" branch 352 and exits 390. If more content exists, the system follows the "no" branch 354 to 314 and continues processing the HTML content.

As shown in FIG. 3, the system accepts user responses during the playing of HTML content. FIG. 4 describes the handling of user responses with a limited response set. The most common situation occurs when a user is accessing the content from a conventional touch tone phone. However other limiting conditions can also occur. The method begins at 400. A user response has been detected. The system obtains the Enhanced Devices An alternative embodiment begins at 500. A customized set of relations between commands and DTMF tones is obtained 502. The DTMF tone is obtained 504. The command 506 associated with the DTMF tone is executed 508. It is determined 510, if the previously accessed page, remains the current page. If the "no" branch is taken 512, the location of the new page is obtained, either by a text entry means or by voice recognition, 514 and the process of FIG. 3 occurs. If the "yes" branch 516 is taken, it is determined 518 if the playing of the current text has been aborted. If the "yes" branch 528 is taken, the playing of the current text is aborted and execution 314 resumes 530. If the "altered" branch 520 is taken, execution 314 resumes at the new location 522. If the "no" branch 524 is taken, the playing of the text continues 526.

Figure 6:
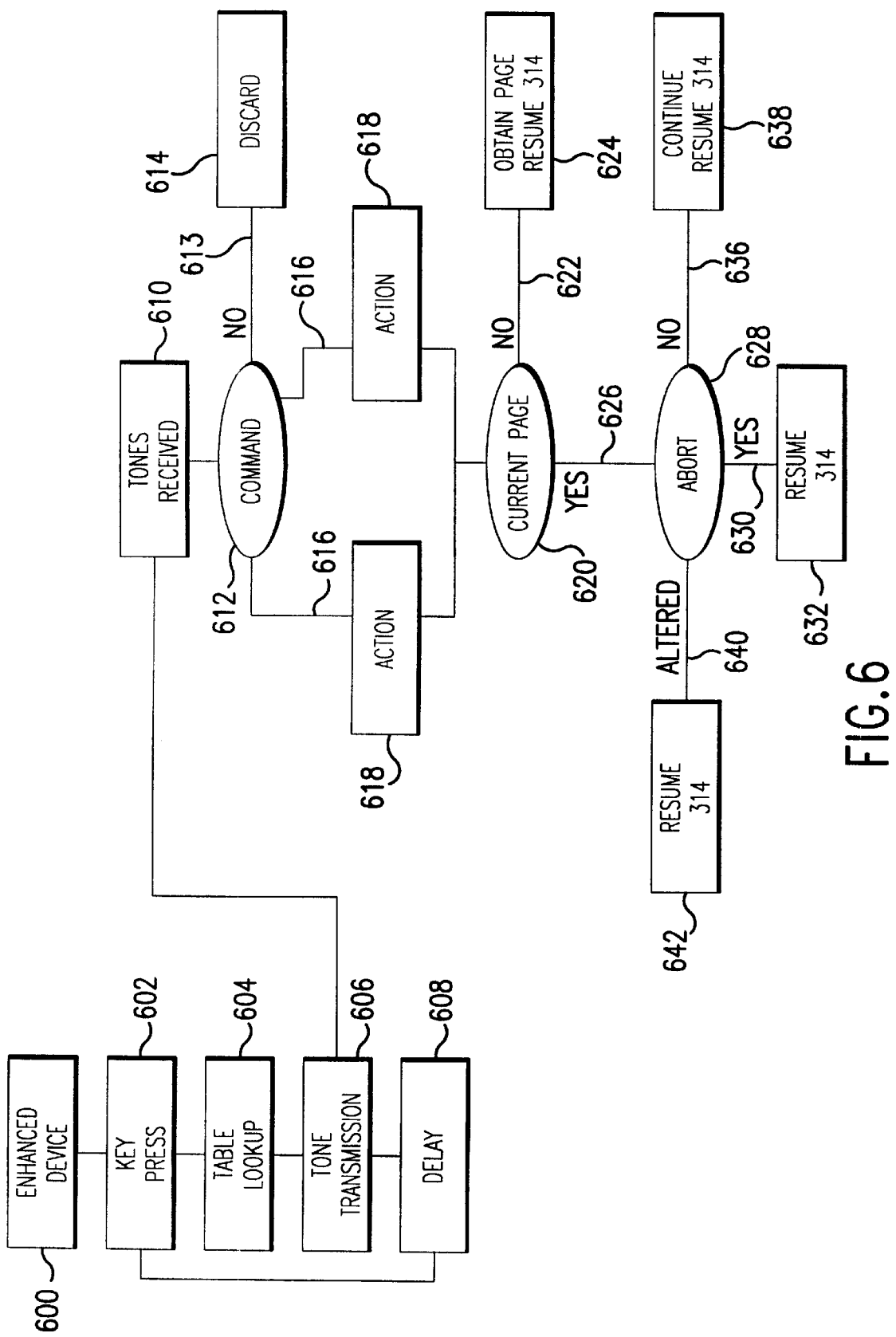
FIG. 6 is a flow chart describing the method by which a device utilizing DTMF (touch-tones) possessing unique combinations can be used to interact with the system.

In the preferred embodiment, the user has a device capable of generating a unique set of DTMF tones corresponding to each of the commands supported by the system. When the user presses the key corresponding to the command, the system obtains the tones and executes the command. This process is shown in FIG. 6. The process begins at 600. The user presses the key corresponding to the desired action 602. The device consults a lookup table 604 to obtain the tones associated with the key pressed. The associated tones are sent 606. A delay occurs 608. The system obtains the codes 610. It is determined if a command is associated with the tones received 612. If no command exists 613, the tones are ignored 614. If a command exists 616, that command is executed. 618. If the command involves page navigation, it is determined 620 by the processes of FIG. 4, if the previously accessed page, remains the current page. If the "no" branch is taken 622, the location of the new page is obtained, either by a text entry means or by voice recognition, 624 and the process of FIG. 3 occurs. If the "yes" branch 626 is taken, it is determined 628 if the playing of the current text has been aborted. If the "yes" branch 630 is taken, the playing of the current text is aborted and execution 314 resumes. If the "no" branch 636 is taken, the playing of the text continues 638. If the position has been altered 640, execution resumes 642 at the new location 314.

An alternative version of the embodiment allows for the existence of a separate device that is capable of generating the unique tones identified with the click event. This device may be attached to the device that send the DTMF tones by a cable or by a wireless transmission means. The process of this device is contained in FIG. 7 and begins at 700. The user takes an action, normally, the making of an electrical contact via a switch 702. However any action that can be detected by any mechanism is equally acceptable. The device generates the DTMF tones 704 associated with the click event. The system detects those codes 706 and execution resumes at 460 in FIG. 4 708.

Figure 7:
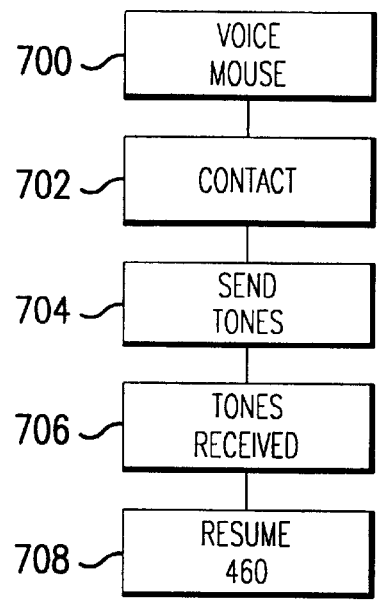
FIG. 7 is a flow chart describing the means by which a "voice mouse" operates.
Figure 7A:
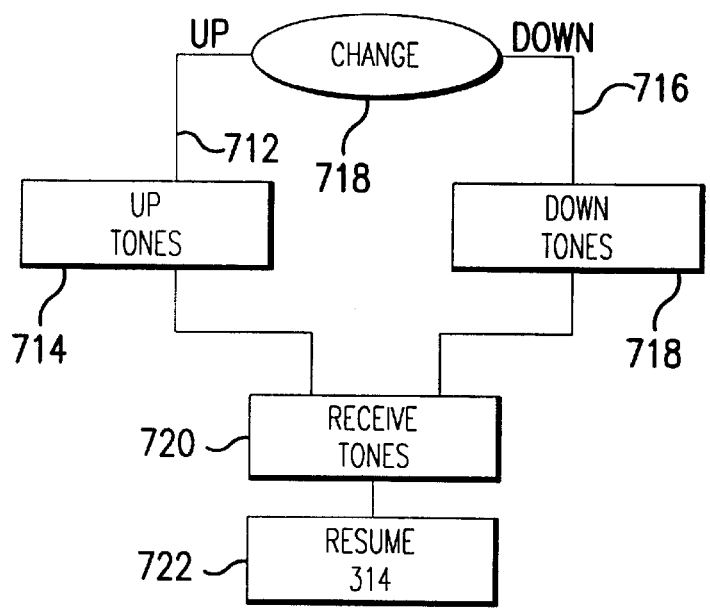
Figure 7B:
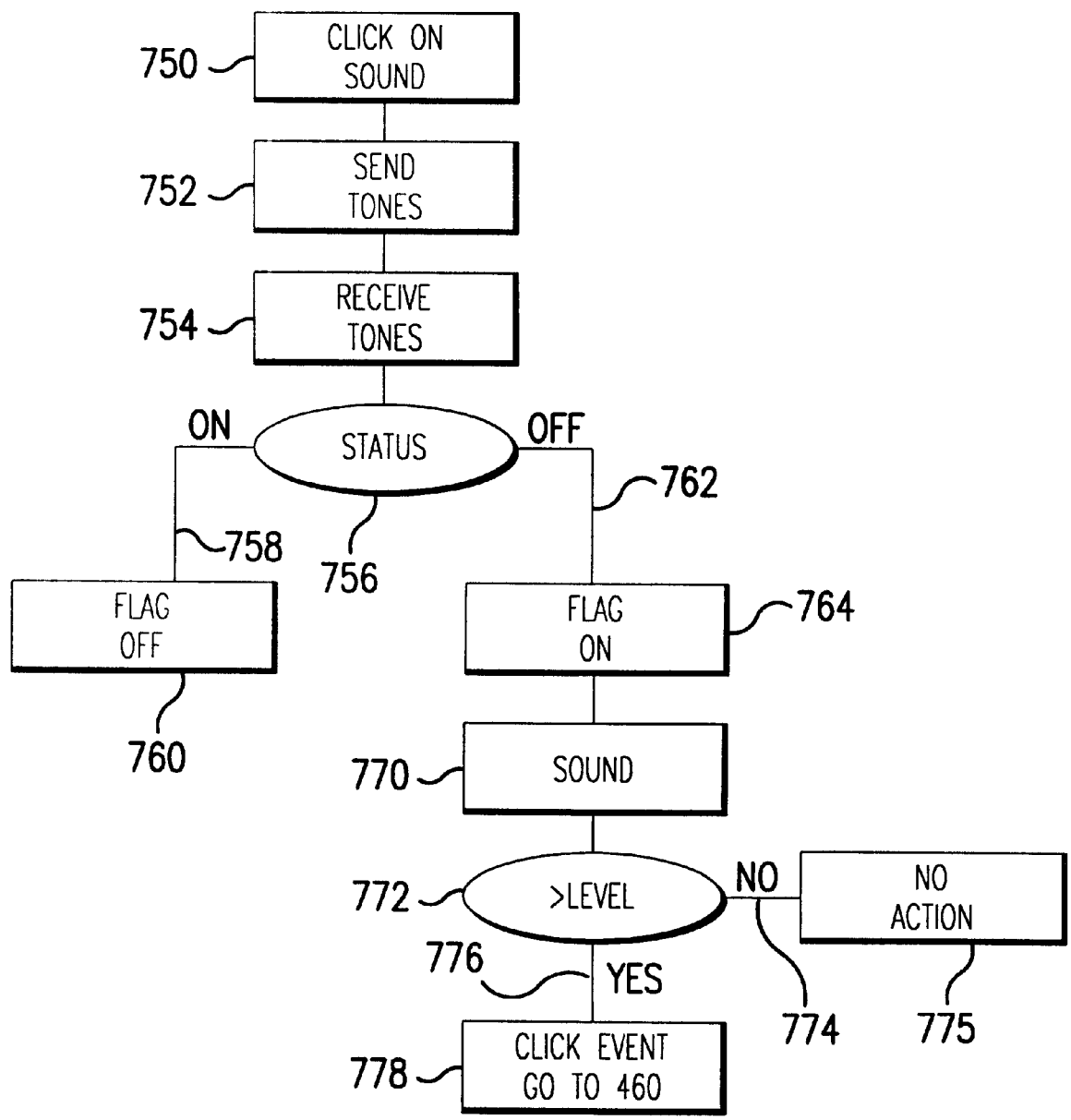

An enhanced version of the embodiment of FIG. 7 allows for the existence of a device with mechanisms capable of detecting directional change. In this embodiment, the user takes an action, normally the movement of a mechanism capable of varying a current, such that a change in value occurs. However any mechanism capable of detecting directional change by a user is equally acceptable. The direction of change is obtained 710. If the direction of the change is up 712, the tones or other signals associated with the scroll up event are transmitted 714. If the direction of the change is down 716, the tones associated with the scroll down even 718 are transmitted. At the receiving system 720, the point of execution 314 is altered and processing occurs as in FIG. 3 722.

A further enhancement is embodied in FIG. 7. A key or other mechanism capable of detecting an event is associated with a unique set of DTMF tones. Upon an event occurring 750, those tones are sent 752. Upon receiving those tones, the processing system 754, the system resets a flag 756. If the current flag condition is "on" 758, the flag is set to the "off" position 760. If the current flag condition is "off" 762, the flag condition is set to "on" 764. When the flag position is "on", the volume of sound on the voice circuit is detected 770. If the volume of sound 772 is below a predetermined level 774, no action is taken 775. If the volume of sound is equal to or greater than the predetermined level 776, the click event 460 of FIG. 4 is executed 778. Alternative embodiments could involve attempting to recognize a particular person's voice, a particular word, a particular sound, such as a hand clap, or a distinctive tone produced by a separate device.

Figure 8:
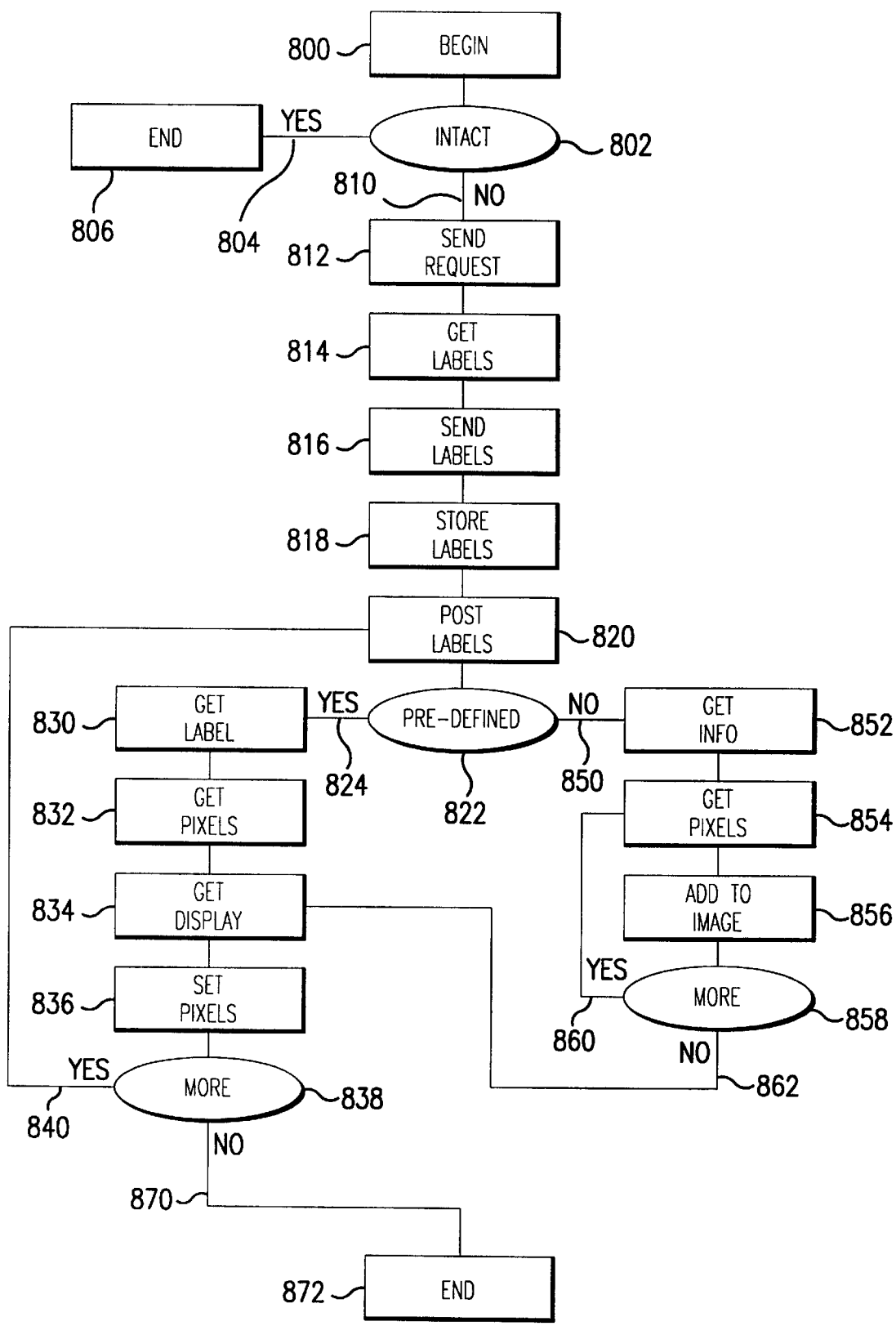
FIG. 8 is a flow chart describing the means by which keys on an enhanced device can display textual or graphic labels describing the functions of the keys.
Figure 9:
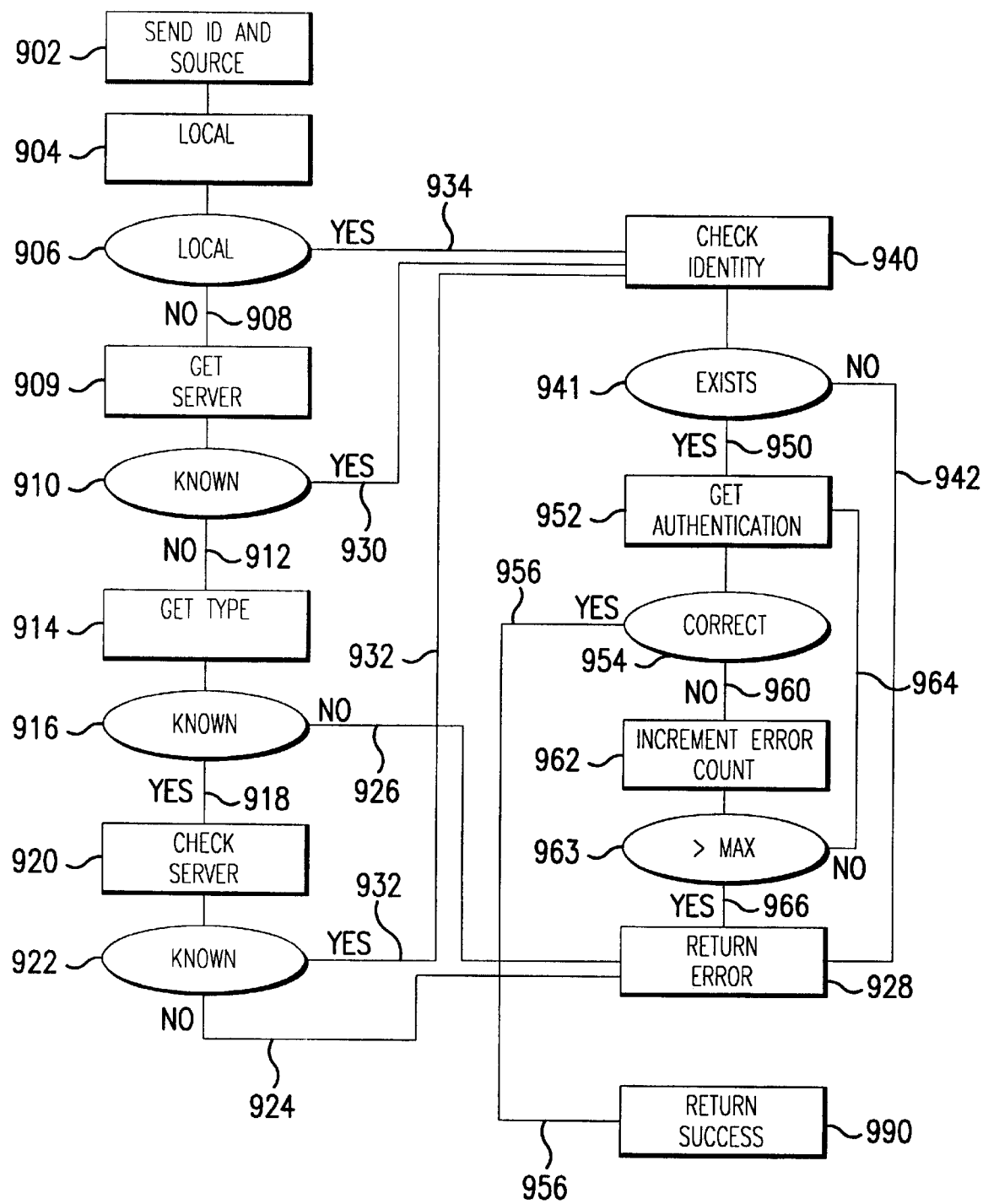
FIG. 9 is a flow chart describing the method by which the identity of a person seeking connection with the system is determined and authenticated.

FIG. 8 details a further enhancement providing for labeling of the keys in FIG. 6. The device contained in FIG. 6 has a changeable display device, such as an LCD screen(s) as well as predefined labels, either text of images. Upon a user customizing the device, the system determines the appropriate label(s) and downloads the settings to the device. The device extracts the predefined label(s) and displays them. Should power to the device be lost, it polls the system for the label(s) upon the next user connection. The process begins with 800. The device checks a memory location for an indicator value 802. If the value is found 804, the device knows that the labels are intact and the process exit 806. If the value is not found 810, the device sends a request for downloading of the labels 812. The system obtains the users settings from the database 814 and sends the label information 816. The information is stored in a memory location 818. The labels can be in two forms. The first form is predefined labels and images. Examples of labels might be "News", "Search", and "Pizza". Examples of images might be a newspaper, a pair of binoculars, and a pizza. The second form is literal words. In this case the word or its abbreviation is spelled out. Note that in the first case only one item of information needs to be sent. In the second case each letter must be transmitted. Once the information is downloaded, the device takes the stored information and creates the actual labels. The process begins with 820, wherein an item of information is extracted from the storage location. The item is examined to determine if it is a predefined label or not 822. If it is predefined 824, the memory location containing the predefined pixels is extracted 830. The values of the pixels are obtained 832. The display location is obtained 834. The pixels are set 836. The memory storage is examined to determine if more labels exist (838). If more labels exist 840, the process returns to 820. If at 822, it is determined that the label is not predefined 850, the values contained in the memory location storing the custom label are obtained 852. The values of the pixels for the first letter or image primitive are obtained 854. The values are placed in temporary storage 856. The information is examined to determine if more letters or image primitives exist 858. If the "yes" branch is taken 860, the process returns to step 854. If the "no" branch is taken, 862, the process branches to step 834. That step leads in turn to step 838. If the "no" branch 870 is taken, the process ends 872.

Identity Server Subsystem

Some of the systems described above and below require that the system be able to obtain values that apply to individual users and/or devices. Such values include the individualized DTMF settings described in FIG. 6, the custom labels described in FIG. 8 above, and the personalized information categories described in FIG. 22. This presumes the existence of a system that identifies individual users and/or devices and information about those users and/or devices. Since the system is intended to serve a world wide audience, it must be able to identify users and/or devices when they move from place to place. The identity server subsystem provides that functionality. The method of that system is contained in FIG. 9. The process begins with 900. The identity of the user and/or device, its authentication, and the identity of the server containing information about that user and/or device is sent to a system capable of receiving the information 902. The system receives the information 904. The receiving system checks to determine if it possesses the information 906. If it does not possess the information 908, it checks to determine 909 if it knows the location of the server possessing the information 910. If the server is unknown 912, it gets the type of the server 914. It checks to determine if the type of server is known 916. If the server type is known 918, it checks with the master server of that type 920, to determine the address of the specific server. That server checks for the address of the specific server 922. If the specific server is unknown 924, an error is returned 928. Similarly if the master server type is unknown 926, an error is returned 928. If the receiving system knows the specific server's address 930 or if it is obtained from the master server 932 or if the identity is contained upon the receiving system 934, an attempt to obtain the identity is made 940. If the identity 941 does not exist 942, an error is returned 928. If the identity exists 950, the authentication for that identity is obtained 952. The authentication is checked 954. If it matches 956, success is returned 990. If the authentication does not match 960, a counter is incremented 962. The value is compared to a maximum 963. If that count is less than a maximum value 964, the authentication is resent 952. If the value is equal to the maximum 966, an error 928 is returned.

Auto Connect Device

Figure 10:
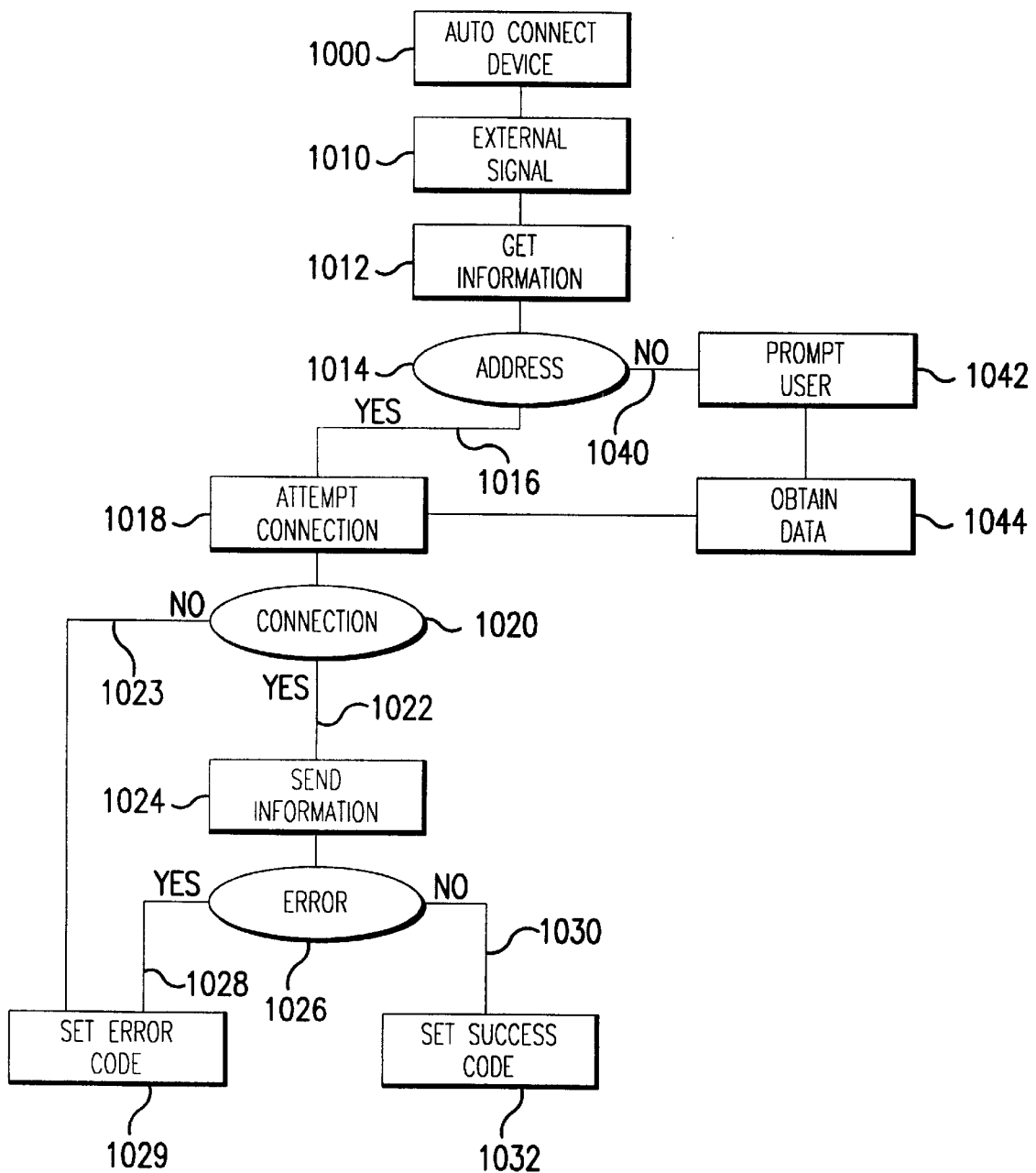
FIG. 10 is a flow chart describing the method by which a device may identify itself to the system, thus establishing a connection.
Figure 11:
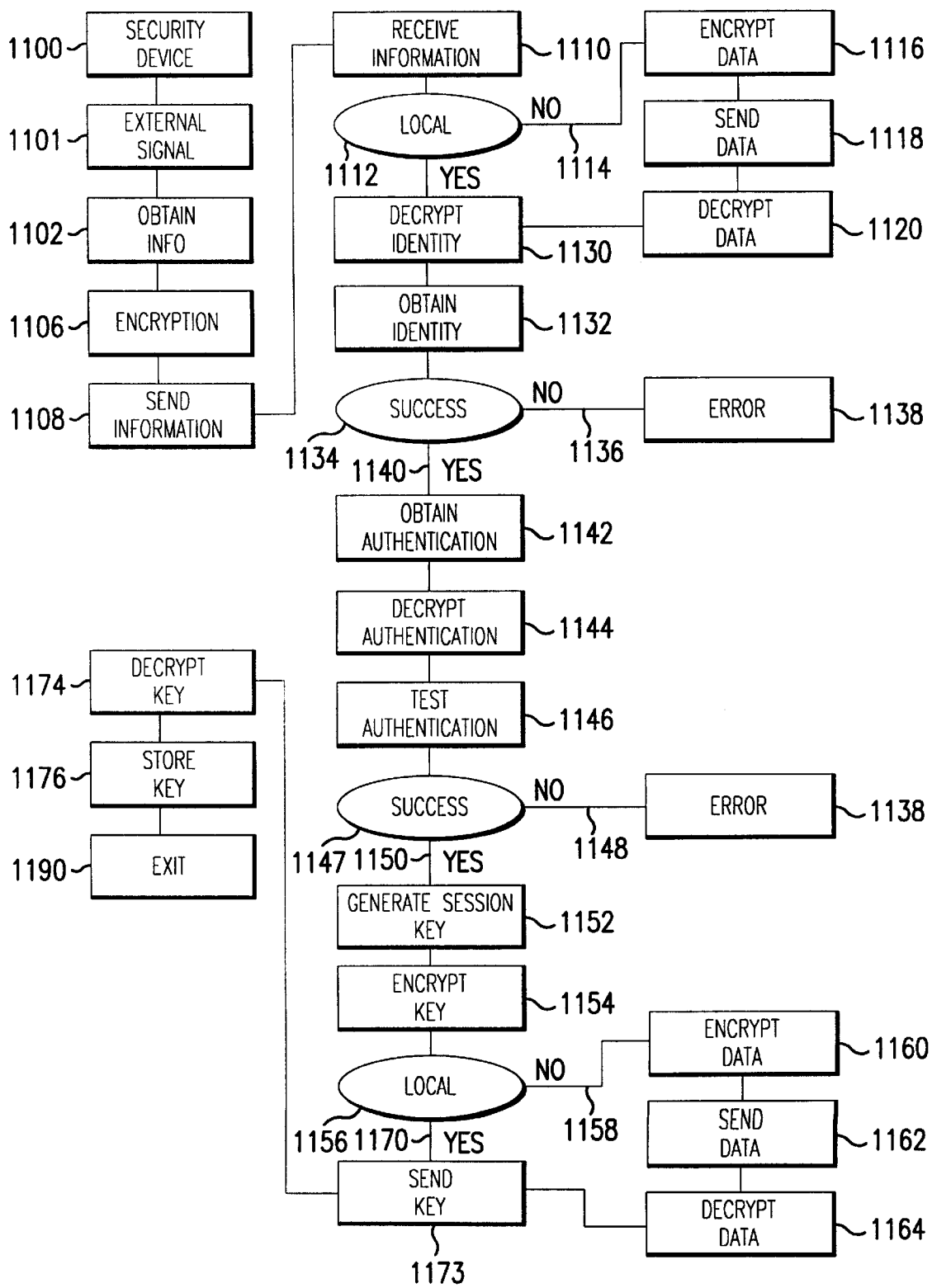
FIG. 11 is a flow chart describing the method by which a device may securely identify itself to the system.
Figure 12:
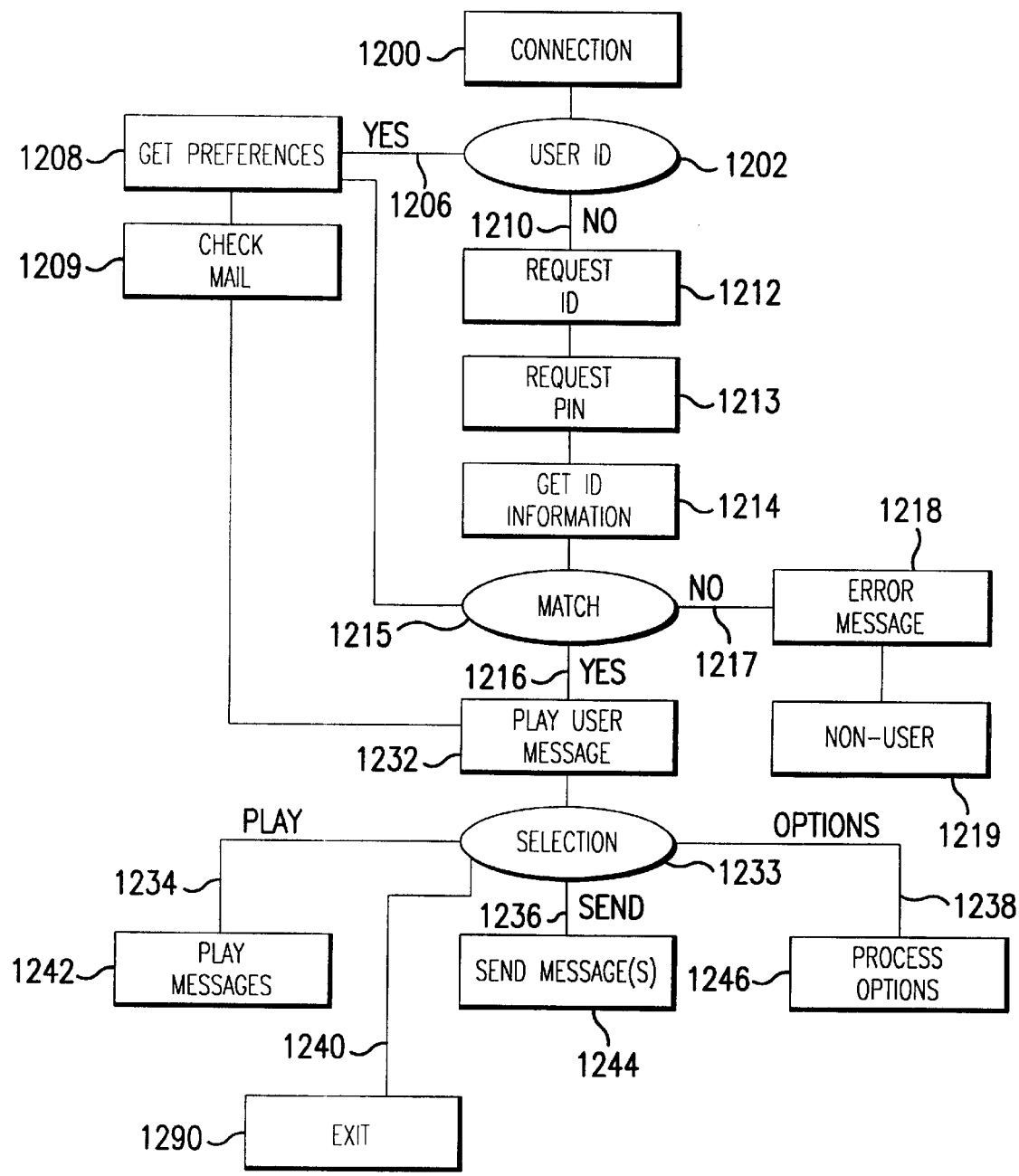
FIG. 12 is a flow chart showing an overview of the means by which the messaging system works.

To facilitate this identification process, FIG. 10 presents a device that automatically connects the user to the identity server. The device is designed to connect automatically upon receiving an initiation signal. Such a signal might be removing the receiver from the hook of a phone, touching a specific button, or upon a word recognition device having identified a specific word or phrase. The process begins with 1000. The signal 1010 causes the identity, the name and type of the identity server and the authentication information to be obtained from a storage location 1012. The device also contains the contact information for a receiving system (FIG. 9, 904) 1014. If that information is available 1016, a connection attempt is attempted 1018. Based on the result of the connection attempt 1020, a connection may be established 1022 or not 1023. If the connection occurs 1022, the information is then sent 1024. The device waits for a code 1026. If an error code is received 1028 or if no connection is established 1023, the device sets an error code 1029 and the process terminates. If an error code is not received 1030, a connection has been made 1032 and this process is complete. If the information is not available 1040, the device prompts user input 1042, obtains the information 1044, and sends the information 1020.

Security Device

An enhancement of the process of FIG. 10 is a device that can transact the automatic identification process using a secure means. Such a device and supporting system is presented in FIG. 11. The process begins at 1100. A signal, such as was discussed above, initiates the process 1101. The device obtains the identity, the server and type containing the identity, the authentication, and the address of a receiving system (FIG. 9, 904) 1102. Additionally it obtains one or more encryption key(s). The authentication is encrypted 1106. Optionally the identity may be encrypted as well. The identity, server, and authentication are sent 1108. The receiving system receives the information 1110. It determines if it is the identity server 1112. If the identity is not stored locally 1114, an attempt is made to located the identity as described in FIG. 9. Optionally the transmissions between these systems may be encrypted 1116 and decrypted 1120 during this process 1118. Once the identity server, local or remote, receives the transmission, it determines if it can decrypt an encrypted identity 1130. It attempts to obtain the identity 1132. It determines if the identity exists 1134. If the identity is unknown or encrypted in a fashion that cannot be successfully decrypted 1136, an error is returned 1138. If the identity is found 1140, the authentication and encryption key for that identity are obtained 1142. The authentication is then decrypted 1144. The authentication is then checked 1146. If the authentication check result 1147 does not match 1148, an error is returned 1138. If the authentication matches 1150, a temporary, session key is created 1152. The temporary key is encrypted 1154. If the receiving system is not also the authenticating system 1156, the remote branch is taken 1158. The temporary key is further encrypted using the transmission encryption 1160. The temporary key is sent to the receiving system 1162. That system decrypts it 1164. If the authentication is local 1170 or at the conclusion of this process, the temporary key is sent to the device 1173. The device decrypts the temporary key 1174. That key is stored 1176. The process concludes 1190 with the temporary key available for further transmissions.

Mail Subsystem

The Mail system described in FIGS. 12–15 allows users to access email using standard Internet protocols, such as SMTP, POP3, and their successors. Users can send, receive, and administer email messages. In addition the system supports quick reply formats that facilitate the use of the system from conventional phones. The system also supports the sending and receiving of email messages wherein the email address is a user's telephone number. This allows users without conventional email addresses to participate in the system. The system allows non-users to send and receive email from a plurality of users with a single point of access.

The process begins at 1200. A party is connected to the system 1202. It is determined if the party has been identified. If the connection process has produced an identity, the "yes" branch, 1206, the preferences of the user are retrieved 1208. Also any new messages for the user are retrieved from the mail server 1209. Alternatively if the connection process has not produced a user identification 1210, the contacting party is prompted for user information 1212 and authentication 1213. The identification is checked 1214. If the process 1215 creates a match 1216, the process continues at 1208. If there is no match 1217, a message is played 1218 and the party is treated as a non-user 1219. For non-user treatment see FIG. 15 below. The system plays the number of new messages 1232 and the user's options. The user selects 1233 from among the options of playing his or her message 1234, sending messages 1236, changing his or her options 1238, and exiting 1240. For the play option 1242, see FIG. 13. For the send option 1244, see FIG. 14. To display the user's options, a HTML page containing links to options is retrieved 1246 and the process continues as in FIG. 3.

Figure 13:
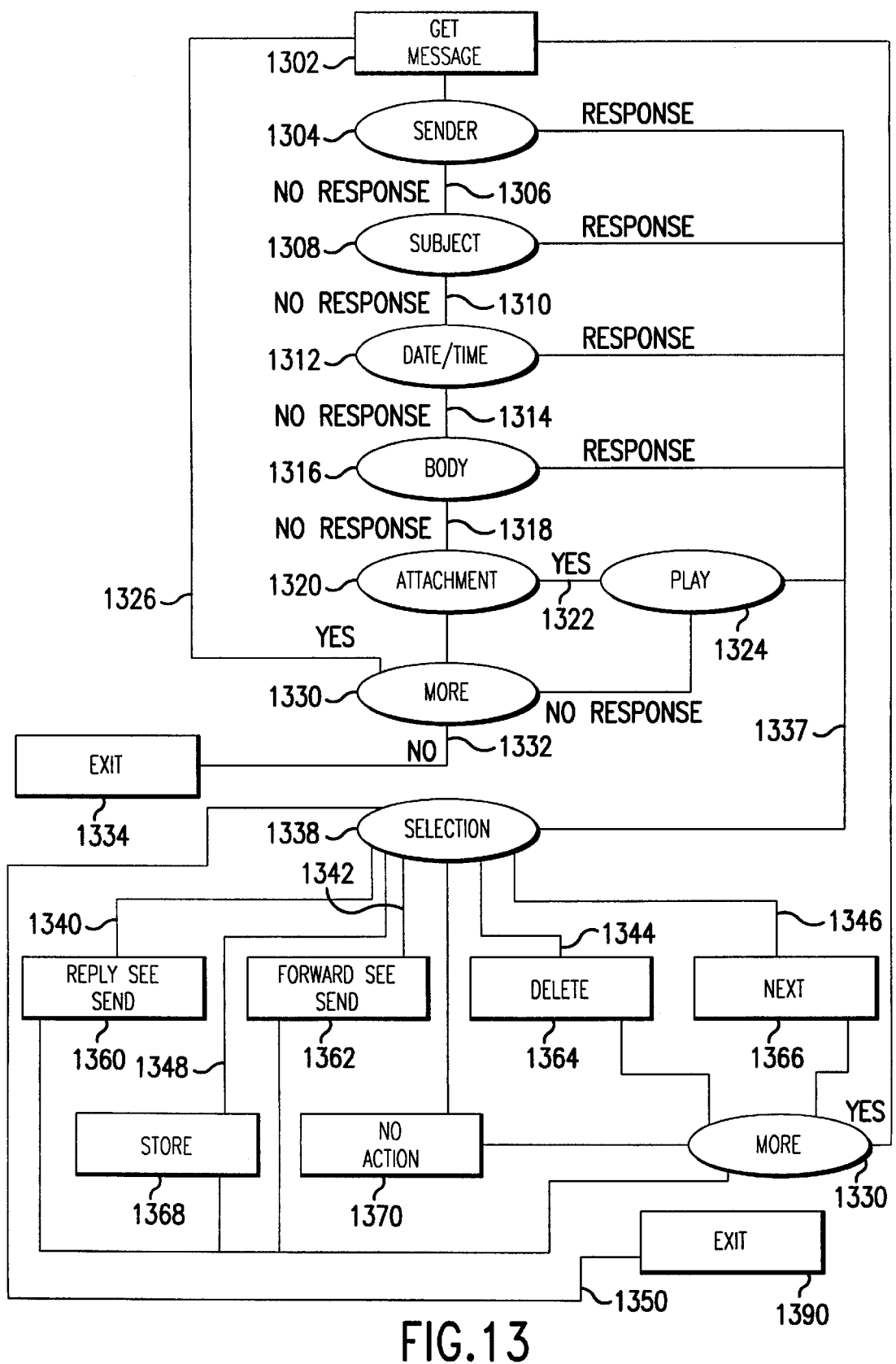
FIG. 13 is a flow chart describing the method by which the user accesses messages.

The Play message option illustrated in FIG. 13, begins at 1300. At 1302 the first message is retrieved. At any time during the playing of the message (1304, 1308, 1312, 1316, 1324), the user can abort the playing 1330 by making a response and obtain processing selection 1332. At 1304, the sender is played. If not response is made 1306, the subject is played 1308. If no response is made 1310, the date/time of the message is played 1312. If no response is made 1314, the body of the message is played 1316. If no response is made 1318, the message is checked for an attachment 1320. If an attachment exists 1322, the attachment is played 1324. If no attachment exists 1326 or no response is made to the playing of the attachment 1328, the system checks for additional message 1330. If no more messages exist 1332, the process exits 1334. If more messages exist 1336, the process returns to 1302 and the next message is retrieved. If at any time the user responds during the playing of a segment (1304, 1308, 1312, 1316, 1324), the system branches 1337 to the playing of user selections 1338. The user is offered the selections of replying 1340, forwarding the message 1342, deleting the message 1344, moving to the next message 1346, storing the message 1348, or exiting 1350. If the user chooses to reply 1360 or forward the message 1362, see FIG. 14. If the user chooses to delete the message 1364, the server deletes it. If the user chooses to store the message 1364, see FIG. 23 1368. If the user chooses to exit 1390, the process terminates. In all other cases or if no action is taken 1366, the process resumes at 1330.

Figure 14:
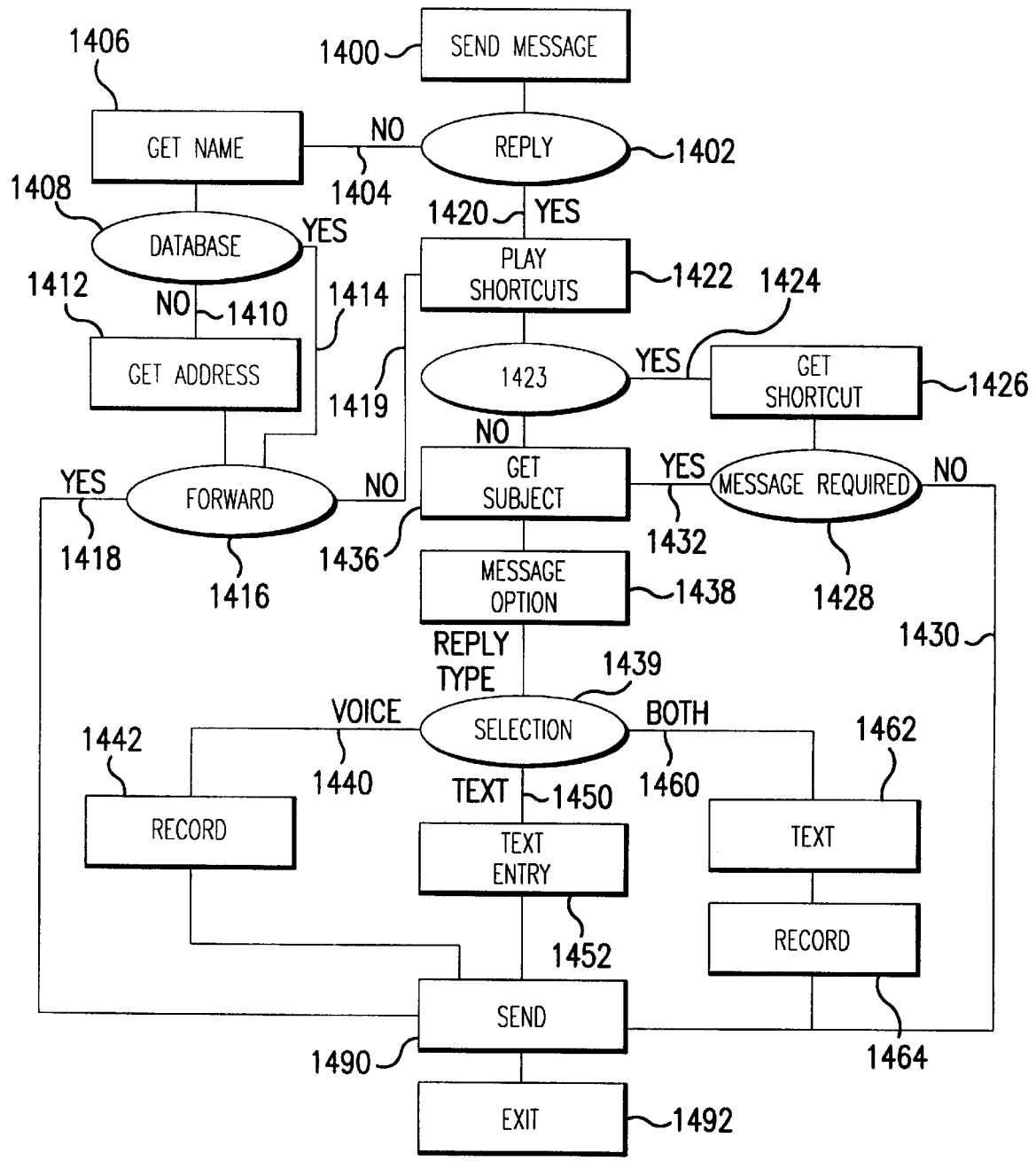
FIG. 14 is a flow chart describing the method by which the user sends messages.

The send option, illustrated in FIG. 14, begins at 1400. Step 1402 determines if the send is a new message. If the send is new 1404, the user supplies identifying information for the recipient, either by a text entry means or by voice recognition, 1406. The system checks to determine if the recipient is contained with in the user's address book 1408. If the "no" branch 1410 occurs, the user is prompted to enter a valid address, either by a text entry means or by voice recognition, 1412. Once this is completed or if the "yes" branch 1414 occurs, the system checks to see if a previously received message is being forwarded 1416. If the message is being forwarded 1418, the message is sent 1490 and the process exits 1492. If the message is not being forwarded 1419 or if the message is a reply 1420, the message shortcut (if any) 1422 are played. The selection is processed 1439. If a shortcut 1423 is selected 1424, the shortcut is obtained 1426. The shortcut is checked to see if a message is required 1428. If no message is required 1430, the message is sent 1490 and the process exits 1492. If the shortcut requires a message 1432 or no shortcut is selected 1434, then the subject is entered, either by a text entry means or by voice recognition, 1436. The messaging options 1438 are presented. If the voice option 1440 is selected, the voice message is recorded 1442 and the digitized voice is attached to the message, the message is sent 1490, and the process exits 1492. If text entry is selected 1450, the text is entered via a text entry means or by voice recognition 1452 as the body of the message, the message is sent 1490, and the process exits 1492. If the text/voice entry selection is chosen 1460, the text is entered as the body of the message 1462, the voice message is recorded and attached to the message 1464, the message is sent 1490, and the process exits 1492.

Figure 15:
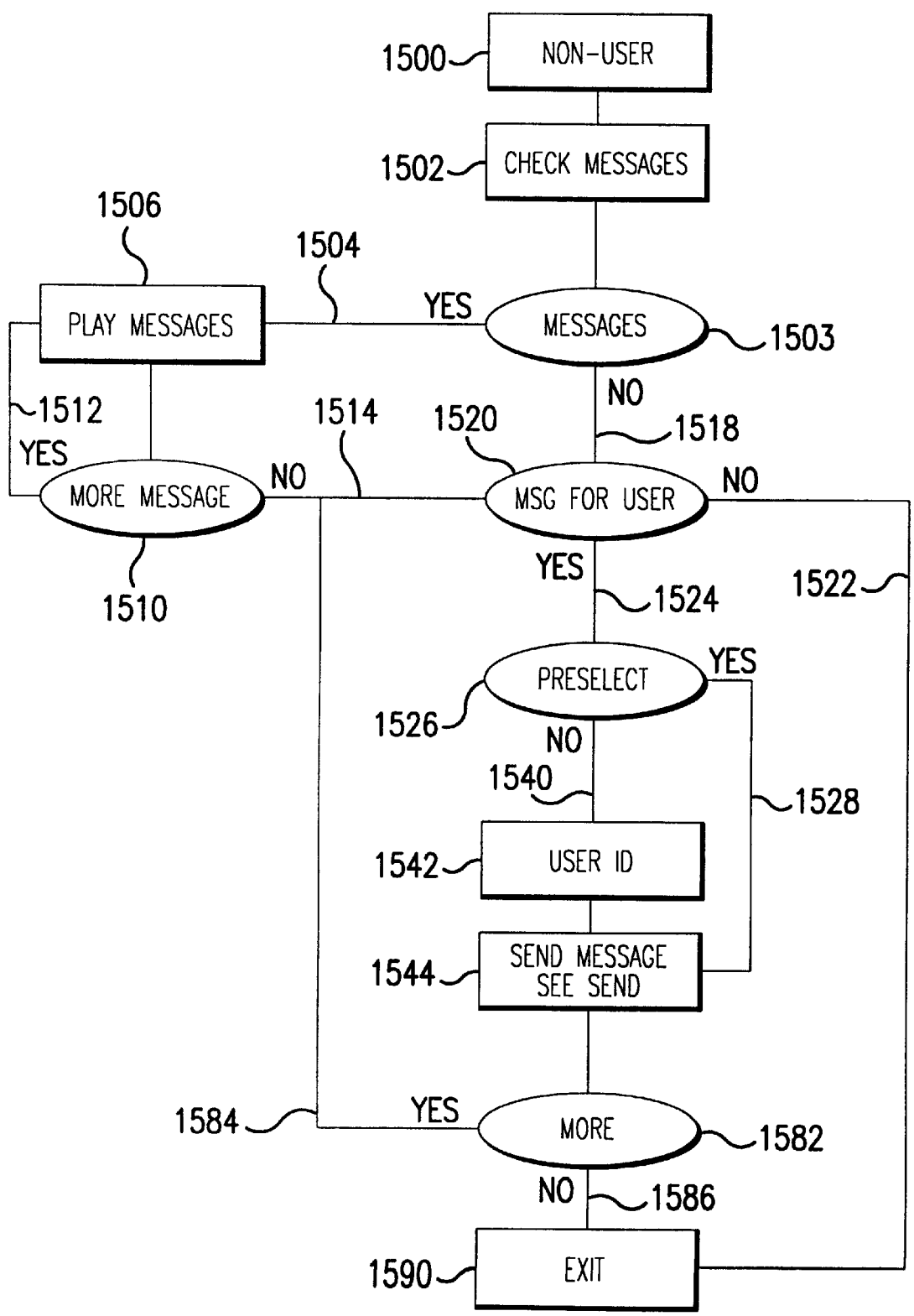
FIG. 15 is a flow chart describing the method by which non-system users can send and receive messages.

The system's ability to support non-user messaging is shown by FIG. 15. The process being at 1500. The system checks the non-user identification information, typically a telephone number or an identification number provided by a user, to determine if it contains any messages for that non-user 1502. If the result 1503 contains messages 1504, it gets a messages and plays it 1506. It then checks to determine if more messages exist 1510. If the "yes" branch applies 1512, messages are obtained and played 1506 until the "no" branch 1514 occurs. If the "no" branch 1514 or the "no" branch 1518 occur, the system prompts for a message 1520. If the "no" branch is selected 1522, the process exits 1590. If the "yes" branch is selected 1524, the system determines if the caller has a preselected user 1526. If the user is preselected 1528, the non-user records a message which is attached to a pre-addressed email and sent 1544. If a user is not preselected 1540, a user identification is entered 1542, the message is recorded 1544, and the message is sent (FIG. 14). The non-user is prompted for another message 1582. If the "yes" branch is selected 1584, the process returns to 1526. If the "no" branch is selected 1586, the process exist 1590.

Contact Subsystem

Figure 16:
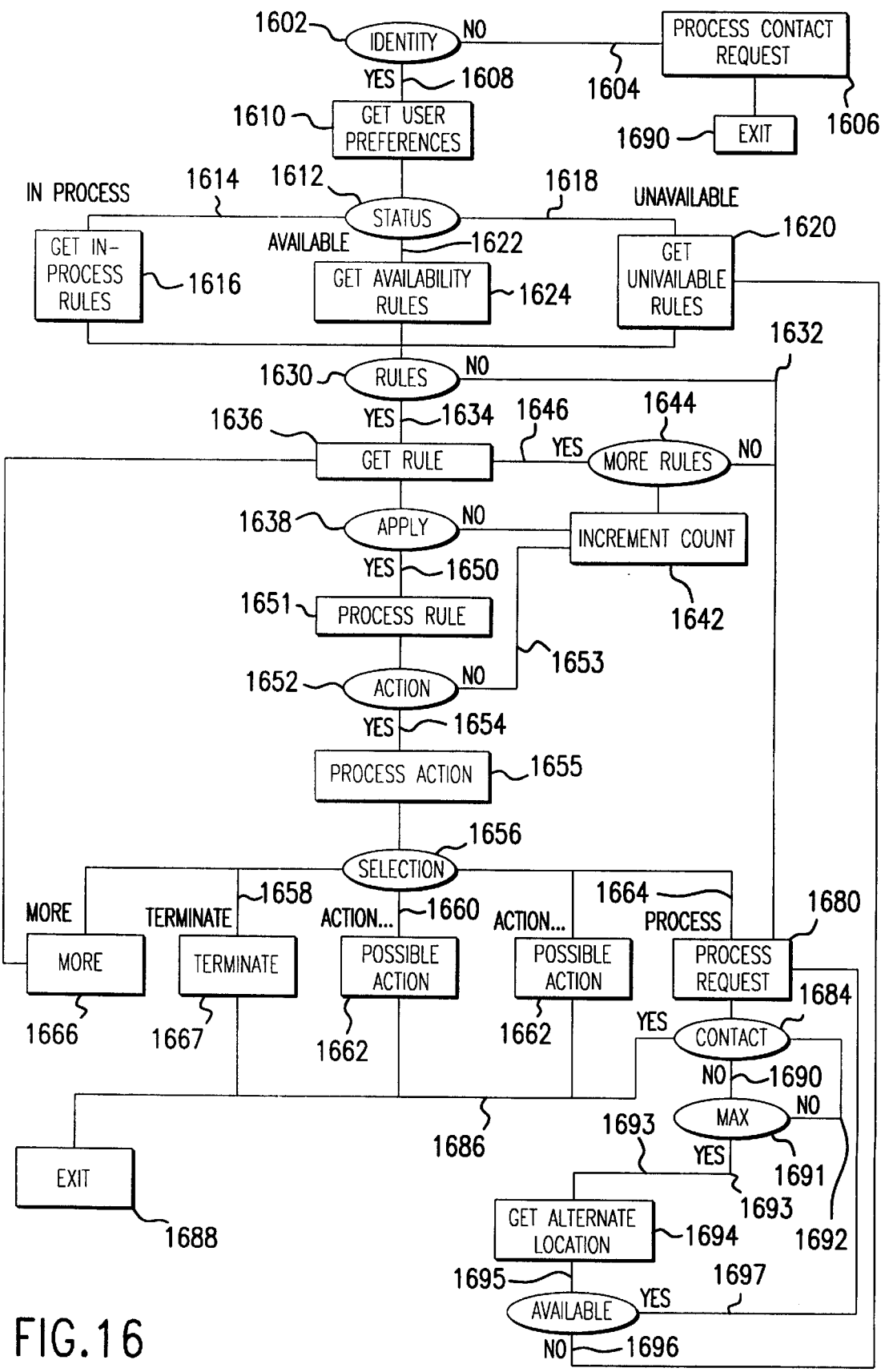
FIG. 16 is a flowchart describing the method by which attempts to establish interactive communication are processed.

The contact management features of the system are shown in FIG. 16. The process begins at 1600 with a contact request, either by an alphanumeric entry method or by voice recognition. An attempt is made to obtain the user's identity 1602, if the system is unable to locate a user identity 1604, the system passes the contact request 1606 and exit 1690. If the user identity is obtained 1608 the user preferences are loaded 1610. The user's availability status 1612 is obtained. There are three user availability statuses. The user may be currently in process, unavailable, or potentially available. For each status the user may set contact rules. If the user has a session in process 1614, the in process rules are obtained 1616. Similarly if the user is unavailable 1618, the unavailability rules are loaded 1620. Finally if the user is potentially available 1622, the user available rules are loaded 1624. The number of rules loaded is checked 1630. If there are no rules for that status 1632, the contact request is processed 1680. If there are rules 1634, the rule is obtained 1636. The rule is checked for applicability 1638. If the rule does not apply 1640, the rule count is incremented 1642 and it is determined if there are more rules 1644. If more rules exist 1646, the process returns to 1636. If no more rules exist 1648, the process moves to 1680. If the rule applies 1650, the rule is processed 1651. Based on the processing 1652, it is determined if an action is required. If the "no" branch results 1653, the process branches to 1642. If the "yes" branch is taken 1654, the action is processed 1655. If the "Terminate" branch 1656 is selected, the process terminates 1657 and the process exits 1698. If an "action" branch results 1660, the action is executed 1662, and the process exits 1698. The diagram shows multiple instances of 1660 and 1662 to represent that many actions are possible. If the "process" branch results 1664, the contact is processed 1680. If the "more" branch results 1666, the process resumes at 1636. An attempt to establish contact is initiated 1680. During the contact attempt 1682, a successful contact 1684 results in the process exiting 1688. If contact is not made 1690, the system determines if the maximum wait has occurred 1691. If the period has not expired 1692, the process continues to wait 1684. If the period expires 1693, the system increments the contact addresses 1694. It then checks for an available contact address 1695. If none are available 1696, the process resumes at 1620 (user unavailable). If further addresses are available 1697, the process resumes at 1682

Contact Suppress Subsystem

Figure 17:
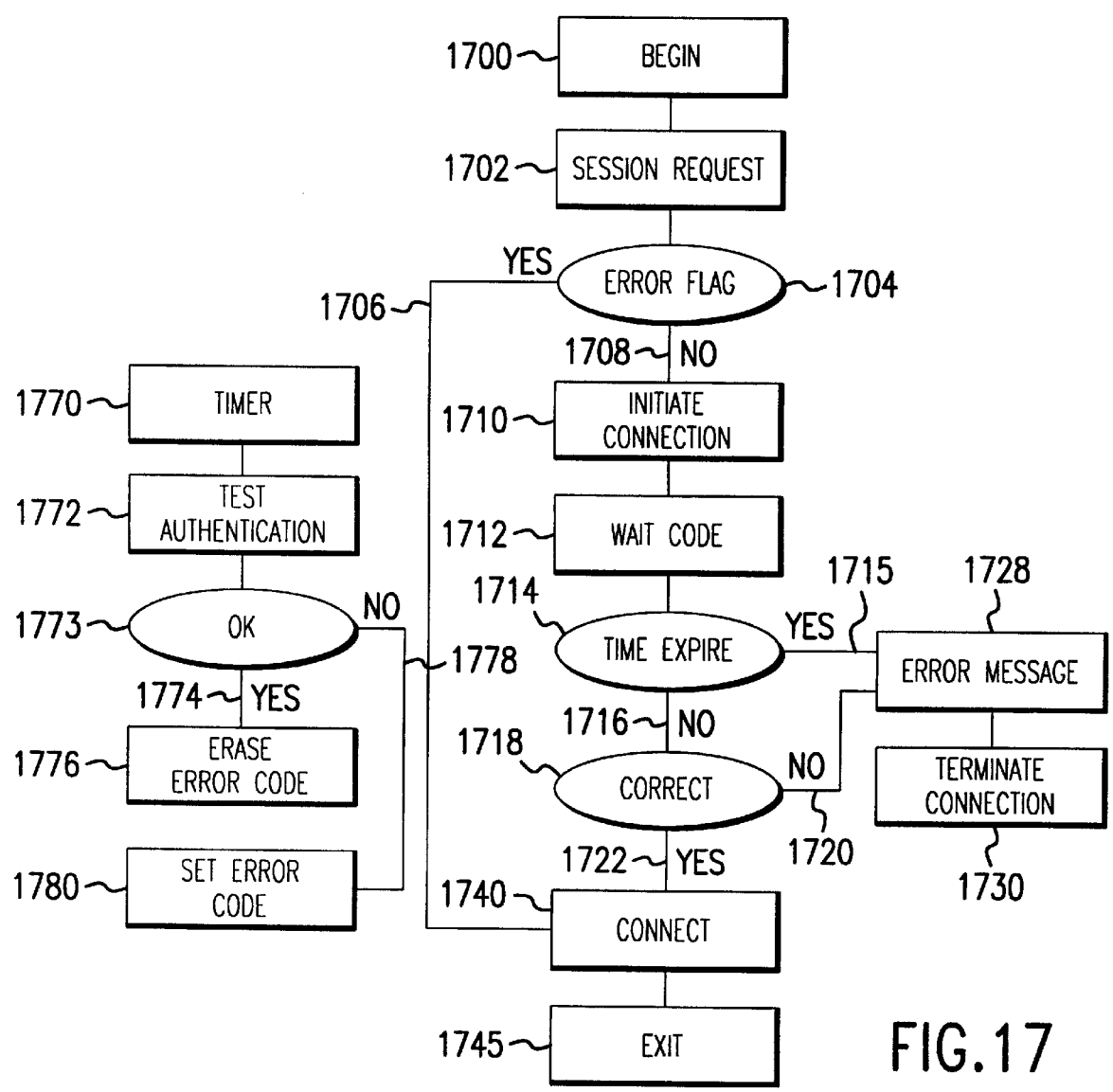
FIG. 17 is a flow chart describing the method by which attempts to establish a communication session s without authentication are prevented.

FIG. 17 details the mechanism by which a user may prevent parties from contacting him/her without following the procedures detailed in FIG. 16. The process begins at 1700. Upon a session request being made 1702, the system checks its error status 1704. If an error has been detected 1706, the requested session is begun 1740 and the process exits 1745. If no error condition exists 1708, a communication session is begun 1710. The device waits for an access code 1712. If the wait cycle expires 1714 prior to a code having been received 1715, the system generates an error message 1728. Once the error message has been communicated, the communication channel is closed 1730. If an access code is received 1716, the code is matched against the stored code 1718. If the codes do not match 1720, the error message is generated 1728. If the codes match 1722, the session request is processed 1740 and the process exits 1745. FIG. 17 also details two methods by which an error condition can be detected. In the first alternative, one or more auto connect devices, as detailed in FIG. 10, are present. Every time the device is used 1750 it verifies the connection status 1752. If the device successfully connects 1754, the error flag is unset 1756. If the connection attempt is unsuccessful 1758, the error flag is set 1760. The second alternative is contained within the contact suppress device itself. A timer 1770 generates a connection test event 1772. If the connection attempt is successful 1774, the error flag is set to zero 1776. If the connection attempt is unsuccessful 1778, the error flag is set 1780.

Voice Proxy Subsystem

Speech to text resources are relatively expensive. In order to conserve these resources, the most commonly used text information can be converted into static voice files (wav, vox, etc.). When the text corresponding to a voice file is required in the future, the voice equivalent can be used instead of requiring a speech to text resource. The process begins a 1800 with a voice request. The voice request is checked to determine if a user identity is present 1802. If a user identity is present 1804, the user language is obtained 1806. If no user identity is present 1808, the location language is obtained 1810. In either case the language is set 1812. The cache is checked for the text material 1814. Caching is the process through which content is downloaded from a server once, and then stored, so it can be served up to viewers none, one or multiple times. A cache is previously stored information that is available for use rather than having to execute a process to obtain and/or transform the requested material. In this case it is text material that has been converted into a form capable of being played over a voice media to a particular user. If the text 1815 is in the cache 1816, the file identifier is returned to the calling process, the usage is incremented 1818, and the process exits. If the file is not available 1820, the page language is obtained 1822. The page and output language match is checked 1824. If the languages do not match 1826, it is determined if a translator for the page language exists 1828. If no translator exists 1830, an error code is set 1832. If a translator exists 1834, the translation mode is set 1836. It is determined if a text to speech device exists 1838. If no text to speech method is available 1840, an error code is set 1842 and the process exits 1844. If a text to speech method exits 1846, the translation mode is checked 1848. If translation is required 1850, the translation is made 1852. Once the translation is complete or if no translation is required 1854, the text is converted to a speech file 1856 in a temporary storage area and the file is returned to the calling process 1858. Available storage is checked to determine if the required space is available to store the file 1860. If space 1861 is available 1862, the file is stored 1864 and a record is made in the cache 1866 and the process exits 1890. If space is not available 1868, the least used cache component is removed 1870. The resulting storage is checked 1872, if the space remains too small 1874, another file is removed 1870, until sufficient space is available 1876. At that point the file is stored 1864 and the cache entry is made 1866, and the process exits 1890.

Adaptive Actions

Adaptive Menuing Subsystem

The menu choices that are presented to a user can dramatically improve the usefulness of the system. The more limited the input modality the more dramatically the system can be improved. There are a number of ways in which the choices presented to a user can be improved. The process of adaptive menuing takes user choices to create menu selections that reflect actual behavior and revises the choices and their ordering based upon that data. This process is detailed in FIG. 19. The process begins at 1900. User information may be passed to the process 1902. If no user data is available 1904, then the system defaults are loaded 1906. If a user identity is available 1910, the user's data is loaded 1912. The loading process obtains the user's choices based upon the user's past behavior. Choices below a threshold are not loaded. The next step is to obtain any choices that may be dictated by the users current situation, if known 1914. That process is detailed in FIG. 20 below. The situational menuing process may add items 1916. If items have been added 1918, then those items are added to the menu choices 1920. Once this process is complete or if the situational menuing process 1922 adds no items, then the process of presenting choices to the users begins 1930. The user is given the opportunity to choose the menu item 1932. If the user selects the item 1934, the choice is obtained 1935 and loaded 1936. The choice is recorded for future use 1937 (see below). The choice is executed 1938. It should be understood that this menu choice may involve additional choices and the process of presenting, recording response information, and executing those choices are also processed. Similarly if no response is given 1940, that information is also recorded for future use 1942 (see below). Once the lack of response is recorded 1942, the list is examined to see if additional choices exist 1950. If no further choices are available 1952, the process exits 1954. If further choices are available 1956, the process repeats 1932. In the same way, a menu tree begun at 1934 may exit and resume at 1950. Processing selections begins at 1960. The system attempts to retrieve prior usage data 1962. If no prior usage data exists 1964, the system creates a usage record 1966. Once this is complete or if prior data exists 1968, the system increments or decrements the usage data 1970. Similarly the recency data is increment or decremented 1972. The last usage date or the last presentation date are recorded 1974 and the process exits 1976.

Situational Menuing Subsystem

Figure 20:
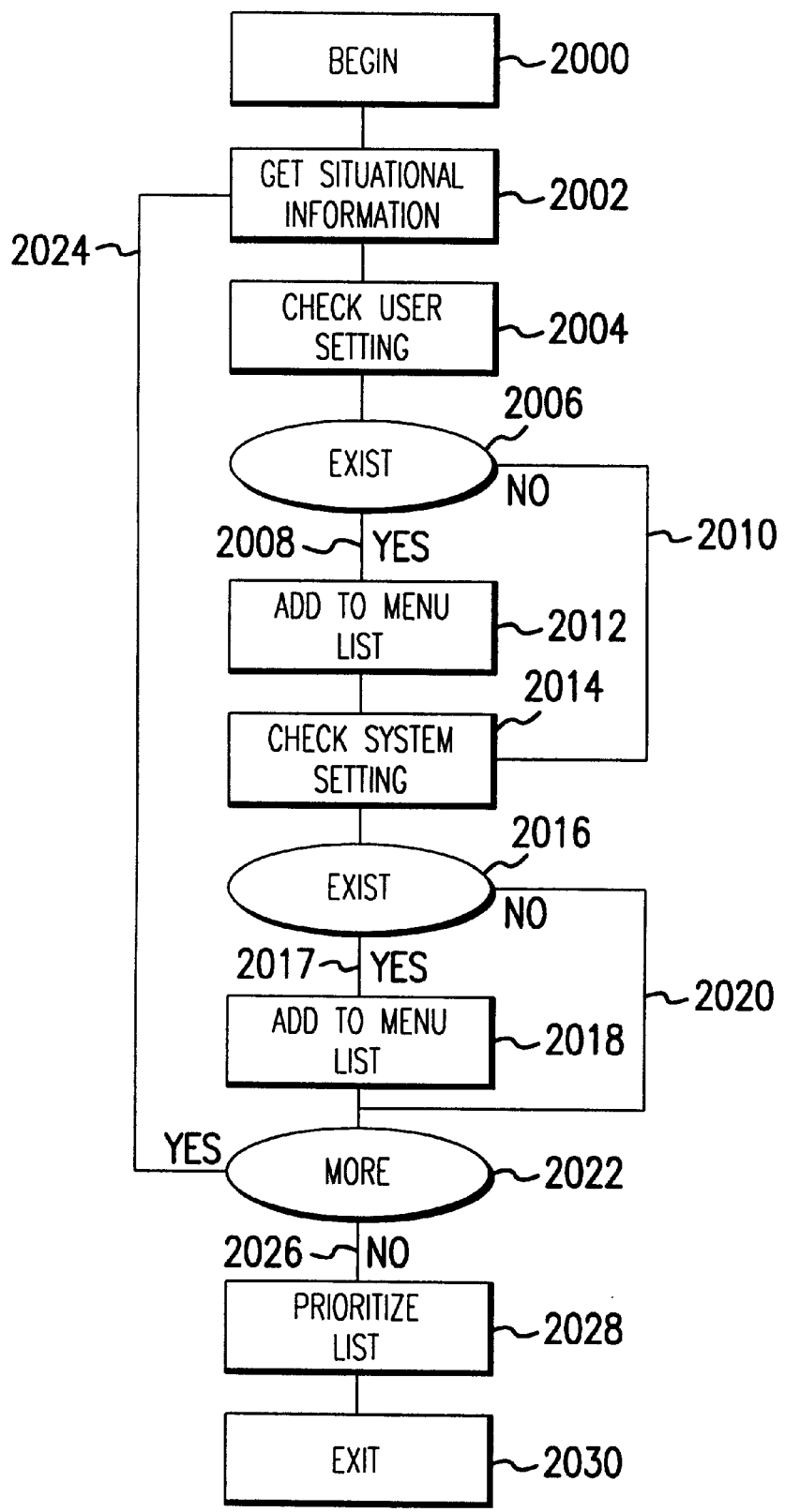
FIG. 20 is a flow chart describing the method by which the choices presented to the user are adapted to the user's current situation.
Figure 21:
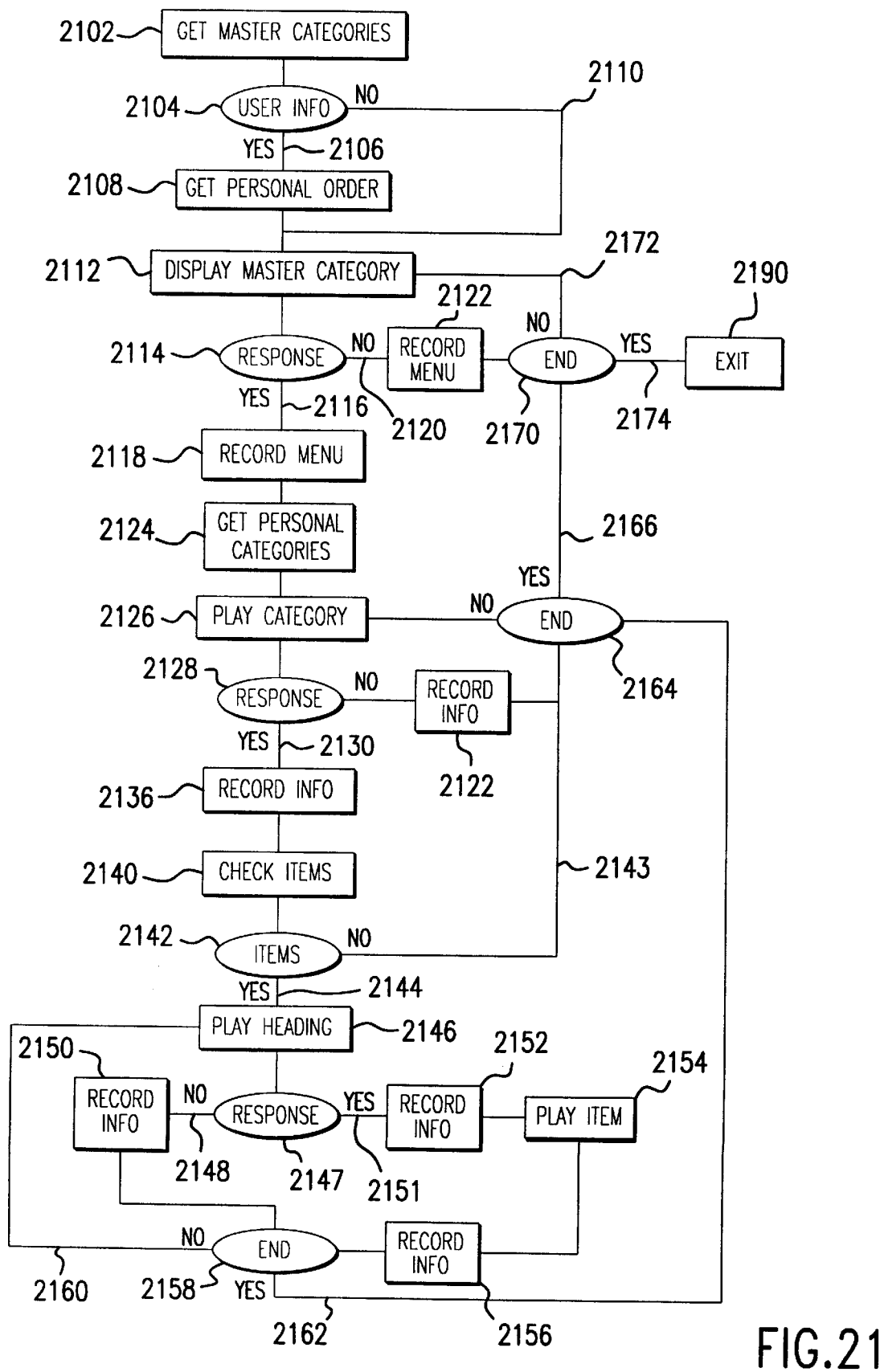
FIG. 21 is a flow chart describing the method by which a user's personalized information is obtained and presented.
Figure 22:
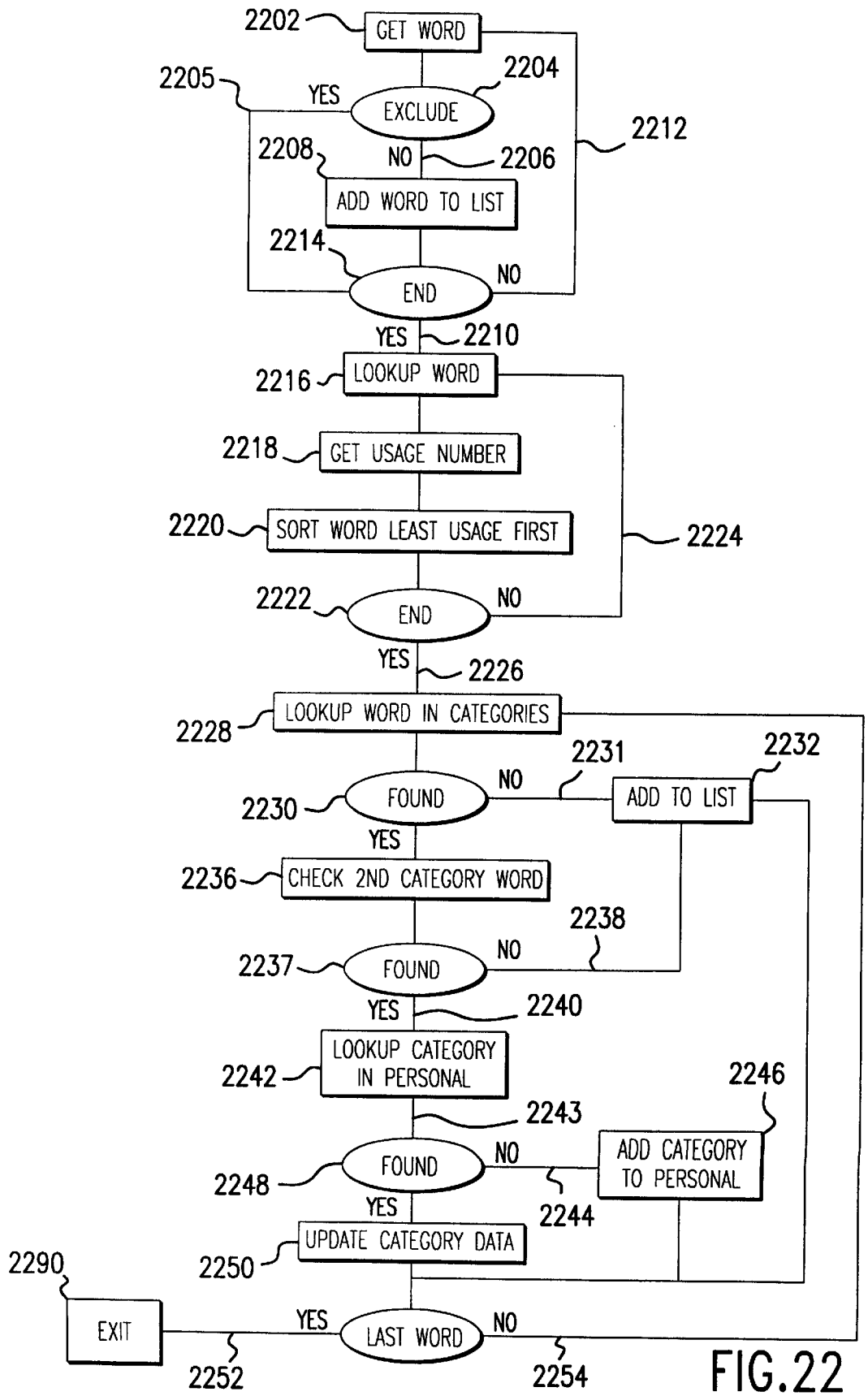
FIG. 22 is a flow chart describing the method by which a user's choices of information is processed.

Situational menuing looks at the information available to the system to determine if the system contains information about the situation in general or about the user's setting for the situation that would provide an improved set of choices to be presented to the user. This process is shown in FIG. 20. The process begins at 2000. The information about the situation is obtained 2002. This should include the date and time, the user's location, if known, as well other contact specific information. For each piece of information, the system is queried for any user settings 2004. If user settings exist 2006, the "yes" branch 2008 is taken. The user settings are added to the menu list 2010. Once this is done or if the "no" branch is taken 2012, the system is queried for any system settings relevant to this situational information 2014. If system settings exist 2016, the "yes" branch is taken 2017 and those settings are added to the menu list 2018. Once this occurs or if no system settings exist 2020, a check is performed to determine if more situational information is available 2022. If more information is available 2024, the process return to 2002 and continues until all situational information has been examined 2026. At that point the resulting choices are prioritized 2028 for presentation to the user and the process exists 2030.

Adaptive Information Subsystem

Presenting information to a user and recording the user's responses to that information work in a similar manner. The presentation process is detailed in FIG. 21. The process begins at 2100. The system retrieves its master categories 2102. Master categories are categories defined at the system level. Examples might be news, business, sports, email, etc. The categories are assumed to be comprehensive such that all possible user information can be subsumed under at least one category. User information is processed at 2104. If user information is available 2106, the categories are ordered in terms of the user's rankings 2108. Once this is completed or if no user information is available 2110, the presentation of the master categories begins 2112. The user is prompted for a response 2114. If the user responds 2116, the response is recorded 2118 (see FIG. 19 above). Similarly if the user does not respond 2120, the response data is recorded 2122 (See FIG. 19 above). The user's personal categories under this master category are obtained 2124. For example under sports, the user's favorite sports teams may be obtained. Similarly under stocks, information about a user's personal stock holdings might be obtained. However it should be noted that this is an evolutionary process. So information about a rival team may be shown. However as a different rival team becomes more relevant, that team may replace the previous rival. Similarly a new company may become of interest and it may replace previously viewed companies. A personal category is presented 2126. The user is given the opportunity to respond 2128. If the user responds 2130, that response is recorded under the user's personal category information 2132 (see FIG. 22 below). Similarly if the user does not respond 2134, the lack of a response is also recorded 2136 (see FIG. 22 below). A search is conducted for items relevant to that category 2140. The search results 2142 may contain items for review. If items are available 2144, the heading or headline of the item is played 2146. Again the user is given a chance to respond 2147. If the user fails to respond 2148, the lack of response is recorded 2150 and the process continues at 2158. If the user responds 2151, that response is recorded 2152. The text of the item is presented 2154. The users response to the text is also recorded 2156. The process determines if additional items are available 2158. If more items are available 2160, the process returns to 2146. If no further items are available 2162 or if the user has not responded to the category 2134, the process determines if additional categories are available 2164. If further categories are available 2166, the process resumes at 2126. If further categories are not available 2166, the process determines if further master categories are available 2170. If further categories are available 2172, the process resumes at 2112. If no further categories are available 2174, the process exists at 2190.

Personal Category Subsystem

The process of creating personal categories can be more complicated than the process of recording responses to pre-defined categories. In some cases this process may simply be one of discovering an existing category. An example of this would be an interest in an existing professional sports team. Alternatively the user may have an interest that is relatively unique and thus does not correspond to any existing system defined categories. This process is contained in FIG. 22. The process begins at 2200. The text being processed is examined word by word 2202. Each word is examined to determine if it should be excluded from further processing 2204. Articles, prepositions, adjectives, and adverbs would normally be included in this list. If the "yes" branch 2205 is taken, the process resumes at 2210. If the "no" branch is taken 2206, the word is added to the list 2208. A check is preformed to determine if the end of the text has been reached 2210. If the "no" branch is taken 2212, the process resumes at 2202. If the "yes" branch is taken 2214, the resulting word list is examined for usage beginning with the first word 2216. The usage number is obtained 2218. The word list is sorted by usage 2220. A check is preformed to determine if the end of the word list has been reached 2222. If it has not been reached 2224, the process resumes at 2216. If the end has been reached 2226, the process continues by obtaining categories that use the word 2228. If categories are not found 2230, the word is added to a list 2232. If categories are found 2234, the remaining words from the original text are checked against the word(s) in the category 2236. If the check 2237 reveals that none of the categories contain any of the remaining words 2238, the word is added to the list in 2232. If one or more of the categories contain one or more of the original words 2240, the user's personal categories are checked to determine if the categories obtained have already been used 2242. If the check 2243 reveals that the categories have not been previously used 2244, they are added to the user's list 2246. If the categories have been previously used 2248, their usage, recency, and last used data are updated 2250. A check is preformed to determine if the end of the word list has been reached 2252. If the "no" branch is taken 2254, the process continues at 2228. If the end has been reached 2256, the process exits 2290.

Information Store Subsystem

Figure 23:
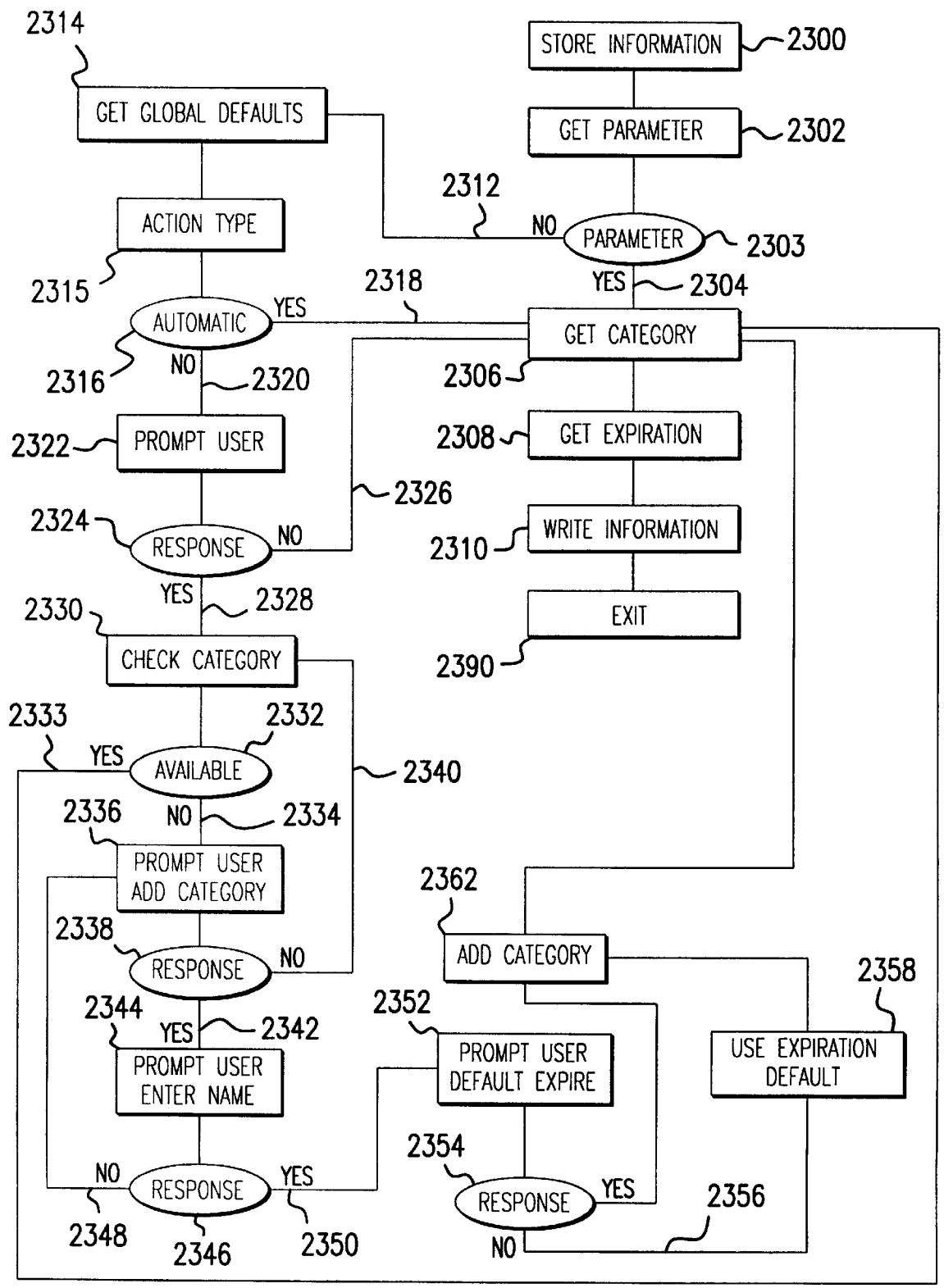
FIG. 23 is a flow chart describing the method by a user may store information accessed through the system.

The process outlined above is intended to help the user discover information that is relevant to his or her concerns. FIG. 23 presents a process by which that information can be stored for future reference. The process begins at 2300 when the user chooses to store information. At 2302 it is determined if the process that called the storage process has passed a storage parameter. If the detection process 2303 shows that a parameter exists 2304, the category is obtained from the parameter 2306 as is the expiration date 2308, and the information is stored 2310 and the process exits 2390. If no parameter has been passed 2312, the global defaults are obtained 2314 and the action type obtained 2315. If the user has chosen 2316 automatic storage, the preset criteria are passed back 2318 to 2306. If automatic storage is not set 2320, the user is prompted with the defaults 2322. The user is given an opportunity to respond 2324. If the user fails to respond 2326, the defaults are passed to 2306. If the user responds 2328, the user is prompted with the existing category 2330. If the user responds 2332 positively 2333, the value is passed to 2306. If the user responds fails to respond 2334, the user is prompted to add a category 2336. The user is given an opportunity to respond 2338. If the user fails to respond 2340, the process resumes at 2330. If the user responds 2342, the user is prompted to enter a category name 2344. The user is given an opportunity to respond 2346. If the user fails to respond 2348, the process resumes at 2336. If the user responds 2350, the user is prompted to enter an expiration period 2352. The user is given an opportunity to respond 2354. If the user fails to respond 2356, the default expiration period is used 2358. If the user responds 2360, the new category is added 2362 and the parameter is passed to 2306.

Figure 24:
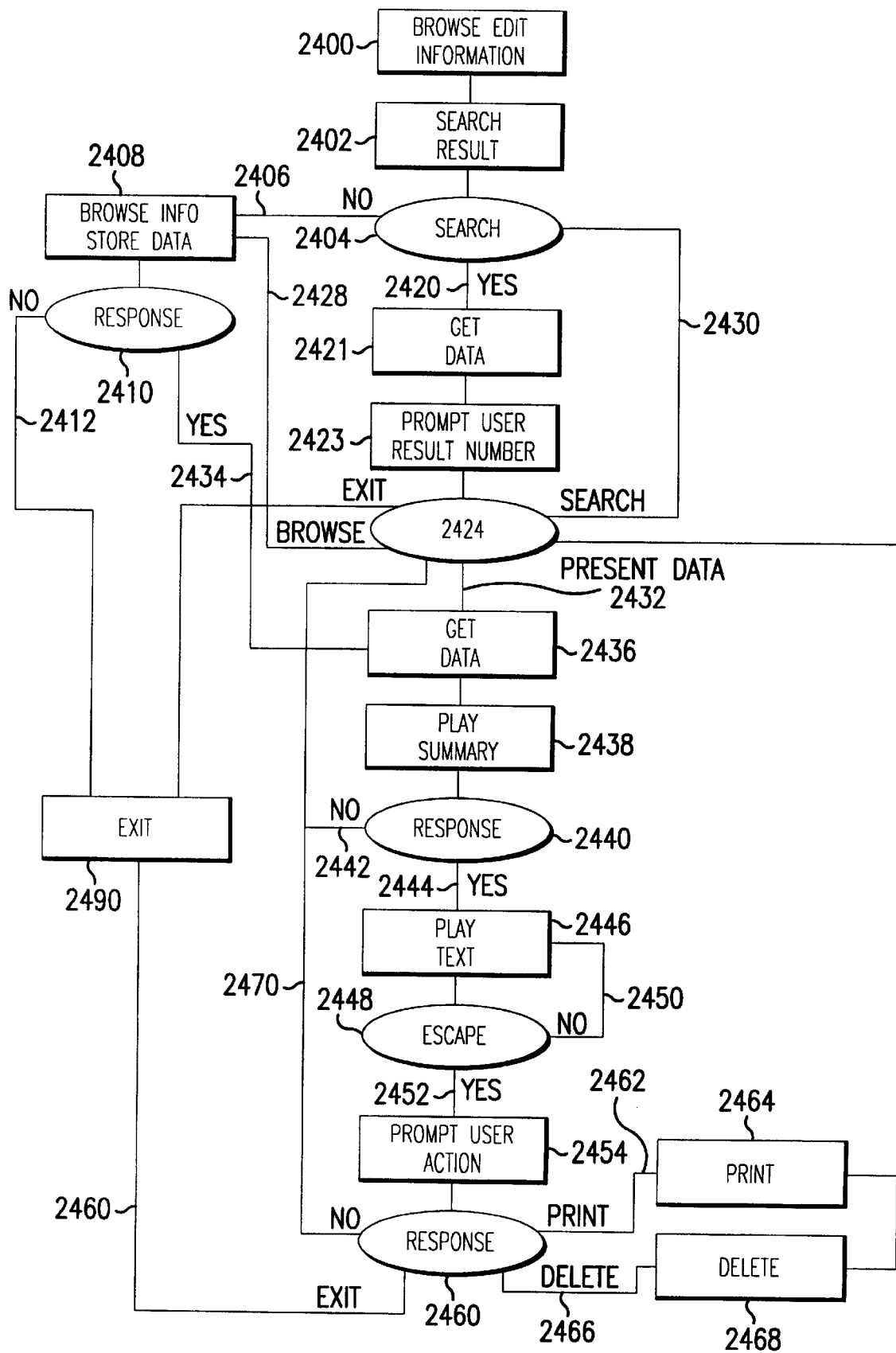
FIG. 24 is a flow chart describing the method by which a user may access the stored information.

Information stored through the process of FIG. 23 may be accessed through the process of FIG. 24. The process begins at 2400. The user is prompted for search information, entered by a text entry means or by voice recognition, or to browse 2402. The user is given an opportunity to respond 2404. If the user fails to respond 2406, the user is taken to the beginning of the information storage area where he/she may browse the existing stored information 2408 by the process of FIG. 3. The user is given an opportunity to respond 2410. If the user fails to respond 2412, the process exits 2490. If the user enters a search term, either by a text entry means or by voice recognition, 2420, the data matching the search term is retrieved 2421. Options are presented to the user 2423. The user is given an opportunity to respond 2424. If the user select "exit" 2426, the process exits 2490. If the user selects browse 2428, the process goes to 2408. If the user wishes to try another search 2430,the process resumes at 2420. If the user locates an entry either by searching 2432 or by browsing 2434, the stored data is retrieved 2436. The item heading or title is presented 2438. The user is given an opportunity to respond 2440. If the user fails to respond 2442, the process resumes at 2422. If the user responds 2444, the body of the stored information is presented 2446. The user is given an opportunity to respond during this process 2448. If the user fails to respond 2450, the presenting of the material continues to completion 2446. If the user responds during the presentation of the material 2452 or at the conclusion of the materials presentation, the user is given a set of action prompts 2454. The user is given an opportunity to respond 2456. If the user fails to respond 2458, the process resumes at 2424. If the user selects the "exit" branch 2460, the process exits 2490. If the user selects the "print" option 2462, the data is printed to the user's default device 2464. If the user selects the "delete" option 2466, the data is deleted 2468. In the cases of 2464 and 2468, the process returns to 2424. If there is no response 2470, the process also returns to 2424.

Content Subsystem

Figure 25:
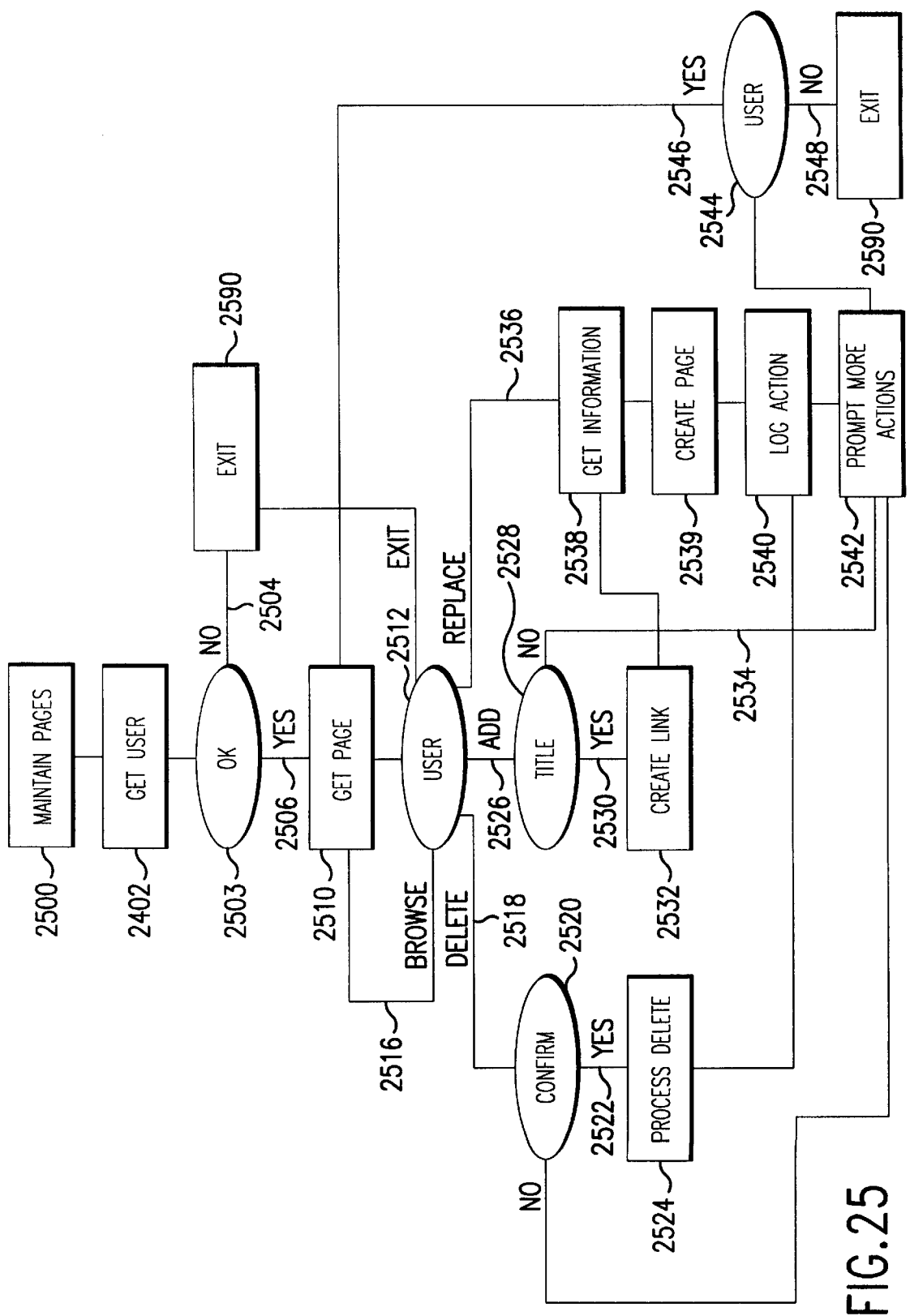
FIG. 25 is a flow chart describing the method by which a user can create http content.

While there is a wealth of http compatible content available, the ability of individuals and small businesses to create and maintain http content is limited by both the costs of the hardware and software necessary as well as by the expertise required to produce this content. The processes of FIGS. 25 and 26 demonstrate a process by which this content can be created and maintained with very limited hardware and expertise. The process begins at 2500. The user identity is established at 2502. If the user identity 2503 can not be established 2504, the process exits 2590. If the user identity is available 2508, the user's home page is obtained 2510. The user uses the process of FIG. 3 to move from that page to a page on which he/she wishes to act 2510. The user is given the opportunity to confirm the page 2512. If the "exit" option is selected 2514, the process exits at 2590. If the "browse" option is selected 2516, the process resumes at 2510. If the "delete" option 2518 is selected, the user is given the opportunity to confirm the deletion 2520. If the "yes" branch is selected 2522, the page is deleted 2524, the action logged 2540 and the user is prompted for additional actions 2542. If the user fails to respond 2521, the process resumes at 2542. If the "add" option is selected 2526, the user is prompted for a link 2528. If the user responds 2530, the link is created 2532 and the process proceeds to 2538. If the user fails to respond 2534, the process resumes at 2528. If the user selects the "replace" option 2536, the process proceeds to 2538 where the page is obtained and then created 2539. This process is covered in greater detail in FIG. 26. The action is logged 2540 and the user is prompted for additional actions 2542. The user is given an opportunity to respond 2544. If the user responds 2546, the process resumes at 2510. If the user fails to respond 2548,the process exits at 2590.

Figure 26:
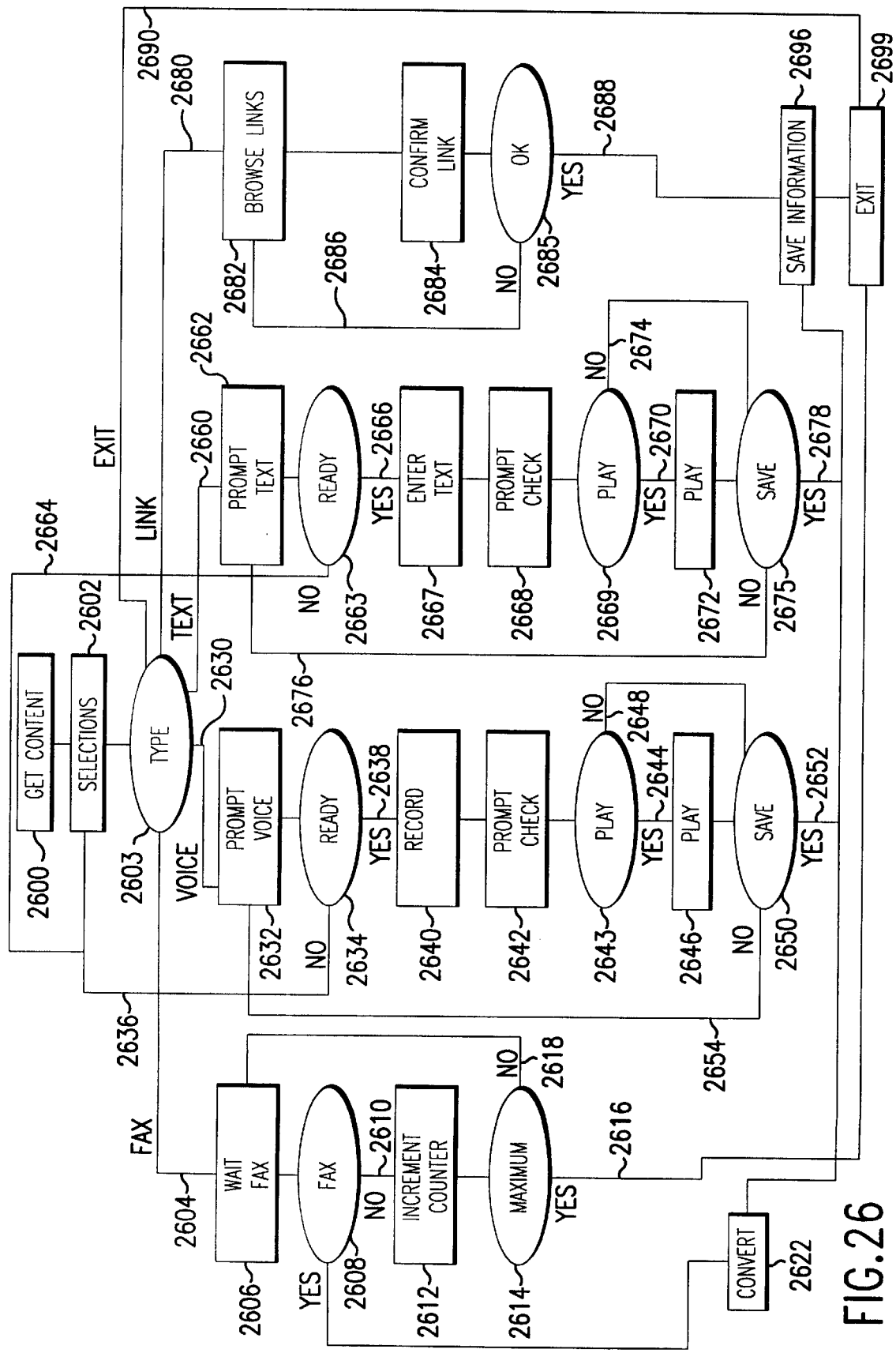
FIG. 26 is a flow chart describing the method by which a user can maintain http content.

The actual process of creating content is covered in FIG. 26. The process begins at 2600. The input selections are presented 2602. The user is given an opportunity to respond 2603. If the "fax" option, 2604, is selected, the process opens a facsimile channel 2606. The system waits for a facsimile transmission 2608. If a transmission is not received 2610, the system increments a timer 2612. The system checks the timer 2614. If the maximum time is reached 2616, the system takes the "yes" branch 2616 and exits 2696. If the maximum is not reached 2618, the system continues to wait 2608. If the fax is received 2620, the fax is converted to a usable format 2622, saved 2696, and the process exits 2698. If the "voice" option is selected 2630, the user is prompted for voice input 2632. The user is then prompted to begin 2634. If the user does not speak 2636, the process returns to the input selections 2602. If the user speaks 2638, the input is recorded 2640. The user is then prompted to replay the recording 2642. The user is given an opportunity to respond 2643. If the user responds 2644, the recording is played 2646. If the user fails to respond 2648 or once the replay is completed, the user is prompted to save the recording 2650. If the user responds 2652, the recording is saved 2696 and the process exits 2698. If the user fails to respond 2654, the process returns to the input prompt 2632. If the user selects the "text" prompt 2660, the user is prompted for text input via a text entry means or by voice recognition 2662. The user is given an opportunity to respond 2663. If no text input is entered 2664, the system returns to the input selections 2602. If the user enters text 2666, the text is captured 2667. The user is then prompted to play the text 2668. The user is given an opportunity to respond 2669. If the user responds 2670, the text is played 2672. If the user fails to respond 2674 or once the playing of the text is complete, the user is prompted to save the text 2676. If the user responds 2678, the text is saved 2696 and the process exits 2698. If the user fails to respond 2679, the process resumes at 2632. If the user selects the "browse" option 2680, the user is allowed to browse via the process of FIGS. 3 -8 2682. Once that process is complete, the user is prompted to save the link 2684. If the user fails to respond 2686, the process returns to the input selection 2602. If the user responds 2688, the link is saved 2696 and the process exits 2698.

Voice Click Subsystem

Voice response systems generally use a menu system for obtaining user actions. Internet applications tend to use a point and click methodology. The process described in FIG. 27 adapts the point and click methods to voice input technology. The process begins at 2700 when a user response is possible. There are several alternative technologies. The calling application can pass a parameter to set the type. The type is obtained in 2702. The type is selected at 2704. If the "distinctive sound" type is chosen 2706, a distinctive sound is obtained 2708. The start sound is played 2710. The choice is played 2712. A timer is set 2714. If the timer has not expired 2718, the system waits for a response 2716. If the timer expires 2720, the end sound is played 2722 and the process exits 2790. If the "background" option is selected 2730, the process obtains the background sound 2732. The sound begins playing 2734. The choice is played 2736. The timer is set 2738. The system waits for a response 2740. If the timer has not expired 2742, the system continues to wait 2740. If the timer expires 2744, the playing of the background sound is terminated 2746 and the process exits 2790. If the "play" option is selected 2750, the mode of distinctive play is obtained 2752. The playing of the choice is modified in the fashion set by the distinctive play option 2754. The timer is set 2756. The system waits for a response 2758. If the timer has not expired 2760, the system continues to wait 2756 If the timer expires 2762, the process exits 2790. If the "timed" option is selected 2770 or no option is passed, the system obtains the time delay 2772. The choice is played 2774. The timer is set 2776. The system waits for a response 2778. If the timer has not expired 2780, the system continues to wait 2776. If the timer expires 2782, the process exits 2790. During all of these processes, the system is waiting for a response 2792. The system checks for a tone 2793. If no response is received 2794, the waiting continues 2792. If a response is received 2796, the response flag is set 2798 and the process exist 2790.

Anonymous Messaging Subsystem

Figure 28:
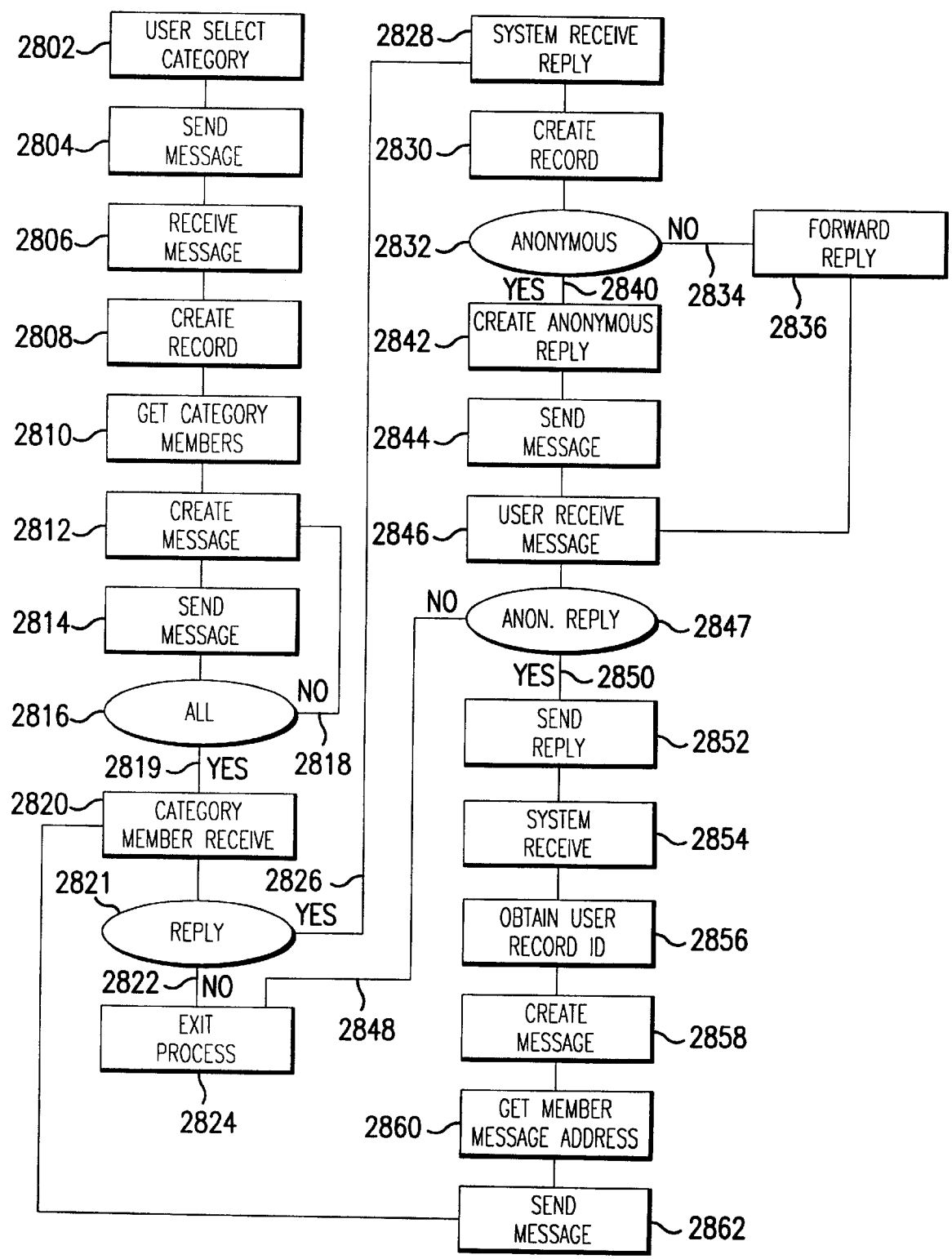
FIG. 28 is a flow chart describing the method by which a user can exchange mutually anonymous messages with a group of other users.
Figure 29:
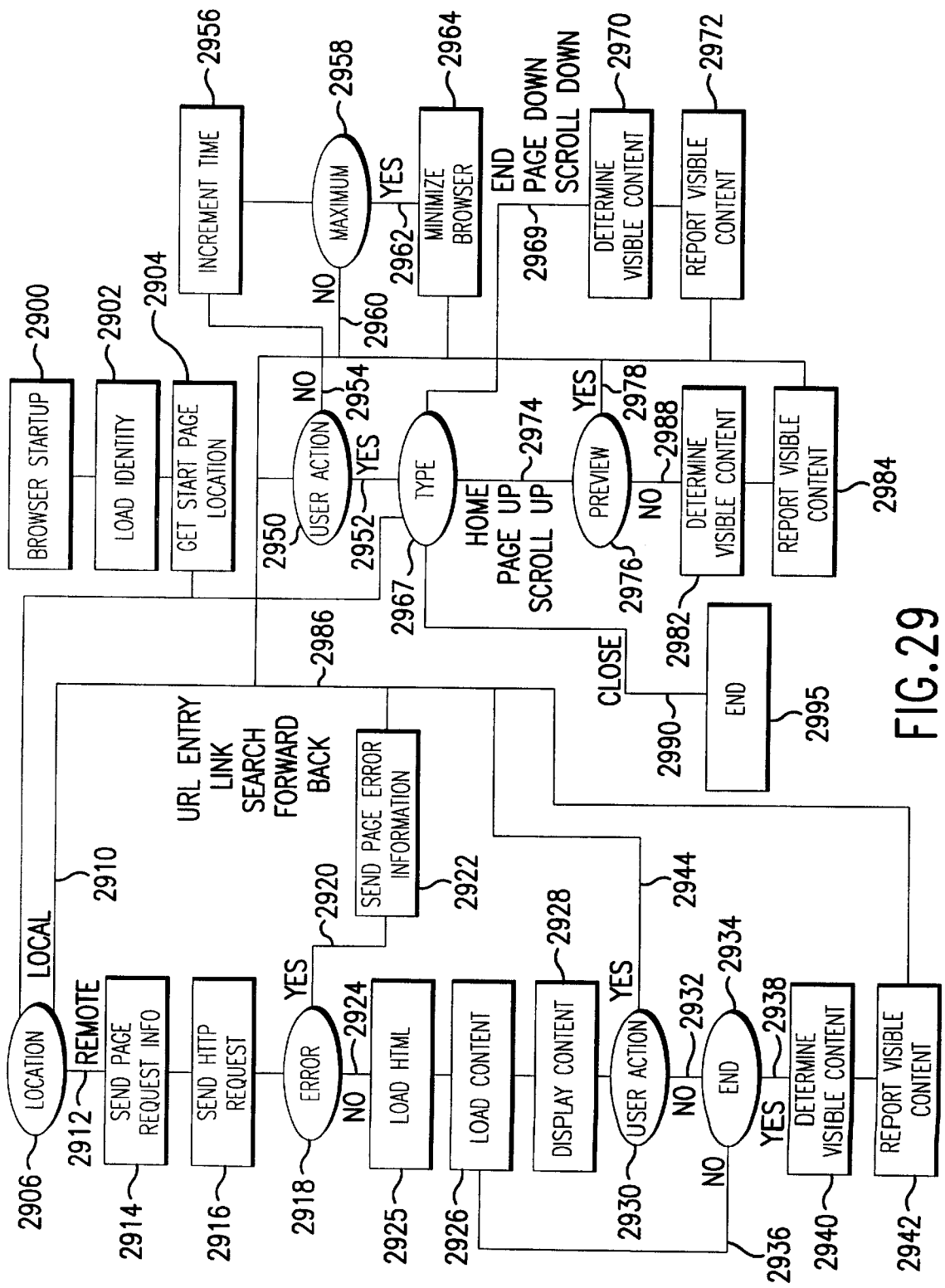
FIG. 29 is a flow chart depicting a modified browsing system of the invention.

1. This system allows users to exchange anonymous messages. The system can be two way, in which both parties are unknown to each other, or one way, in which the sending party is anonymous, but the receiving party is known. This process is detailed in FIG. 28. The process begins a 2800. The sending party selects a category of users to whom he/she wishes to send a message 2802. The message is sent 2804. The system receives the message 2806. It creates a record of the message 2808 with a unique identifying number and the identity of the sending party. It then get the members of the category to whom the message was addressed 2810. It creates a message for the first member of the group 2812 and sends the message 2814. It then checks to determine if all members of the group have been messaged 2816. If they have not 2818, the process resumes at 2812 until all group members have been messaged 2819. One or more category members receive the message 2820. If the group members choose 2821 not to reply 2822, the process exits for that group member 2824. If the member chooses to reply 2826, the system receives the group members reply 2828. It creates a record of the replay 2830. It then determines if the group member wishes to be anonymous 2832. If the member does not choose to be anonymous 2834, the member's reply is forwarded to the sending party 2836. If the group member chooses to be anonymous 2840, an anonymous reply is created 2842, using the reply identity as the identifier for possible future messages between the parties. The message is sent 2844. The originating party receives the reply 2846. If the originating party does not choose 2847 to send an anonymous reply 2848, the process exits for this exchange 2824. This condition could result in no further messaging. It could also be the result of the responding party having replied with his/her email address. Under those circumstances normal messaging could be occurring. If the originating party wishes to continue the exchange 2850, he/she sends a reply 2852. The system receives the reply 2854. It obtains the originating parties identification 2856, creates a message 2858, gets the replying parties address 2860, and sends the message 2862. At this point the process resumes at 2820. This process can continue indefinitely or until the parties choose to discontinue the exchange or identify themselves and exchange messages in a conventional fashion.

Browser Use Recording Subsystem

This subsystem allows for transmission of the actions taken with a conventional, computer or other device capable of text and/or graphic displays and an Internet browser. Those actions then become available to the system for other purposes. The process begins at 2900 when the browser becomes active. The identity of the user and the location of the remote storage facility are obtained 2902. The start page/home page location is obtained 2904. It is determined 2906 if the page is located on the Internet (or other remote site) or is local 2910. If the page is local, the process continues at 2950. If a page is located on the Internet 2912, the location of the page is transmitted to the remote storage facility 2914. The http request is sent 2916 and the subsystem waits for the content or an error message 2918. If an error message is received 2920, the error state is transmitted to the remote site 2922. If the content is received 2924, the browser loads the HTML statements. The HTML contain other elements, such a graphics, that must also be loaded 2926. As those items are received, they are displayed 2928. The system waits for user actions 2930, during this process. If the user takes no action 2932,during the process, the system checks to determine if all referenced materials have been received 2934. If all materials have not been received 2936, the process continues at 2926. If all content has been received 2938, the visible content is determined 2940 and reported 2942. The process continues at 2950. If the user takes an action 2944, the process continues at 2952. If the start page is local 2911 the process continues at 2950. The system waits for a user action. If no action occurs 2954, the time is incremented 2956. The amount of time is checked at 2958 and, if the maximum time is not reached 2960, the process continues at 2950. If the maximum time is reached or exceeded 2962, the browser is minimized 2964. If the user responds 2965, the type of response is determined 2967. If the response if a scroll down, page down, or end 2969, the visible content is determined 2970 and reported 2972. The process continues at 2950. If the response is a home, page up, or scroll up action 2974, the previously visible content is checked 2976. If the content was previously visible 2978, the process continues at 2950. If the content was not previously visible 2980, the visible content is determined 2982 and reported 2984. If a URL entry, link, other page link, forward, or back action is taken 2986, the process continues at 2910. If the browser is closed 2990, the process ends 2995.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A system for navigating content residing on a server using a telephone, the system comprising:
   (a) a communication network;
   (b) a telephone in communication with the communication network, wherein the telephone comprises means for transmitting at least one audible navigation signal and means for receiving at least one audible content signal;
   (c) a server including a database for storing content; and
   (d) processing means in communication with the database on the server and the communication network for performing the steps of:
      (i) receiving from the communication network the at least one audible navigation signal;
      (ii) in accordance with the navigation signal, accessing the database for storing content on the server;
      (iii) generating at least one audible content signal corresponding to the accessed content by converting textual content to speech, the at least one audible content signal including audible indications of hyperlinks included in the accessed content; and
      (iv) transmitting over the communication network the at least one audible content signal to the receiving means of the telephone.

2. The system of claim 1, wherein the communication network supports the HTTP protocol.

3. The system of claim 1, wherein the content is textual content.

4. The system of claim 1, wherein the content is a hypertext document.

5. The system of claim 1, wherein the processing means further comprises means for determining whether the at least one audible navigation signal exceeds a predetermined volume level and, if so, forwarding the at least one audible navigation signal to the accessing means.

6. The system of claim 1, wherein the content further comprises at least one user notification portion and wherein the processing means further comprises means for generating at least one audible signal corresponding to the at least one user notification portion.

7. The system of claim 1, wherein the at least one audible navigation signal corresponds to a request to replay the content, and wherein the system comprises means for retransmitting the at least one audible content signal over the communication network to the receiving means of the telephone.

8. The system of claim 1, wherein the at least one audible navigation signal corresponds to a request to skip the content, and wherein the system comprises means for halting the transmission over the communication network of the at least one audible content signal to the receiving means of the telephone.

9. The system of claim 8, wherein the system further comprises means for resuming the transmission over the communication network of a subsequent portion of the at least one audible content signal to the receiving means of the telephone.

10. The system of claim 1, wherein the content corresponds to a plurality of user-selectable actions.

11. The system of claim 1, wherein the at least one audible navigation signal is a DTMF tone.

12. The system of claim 11, wherein the telephone further comprises at least one key which corresponds to a selected navigation command.

13. The system of claim 12, wherein the telephone further comprises means for generating an audible navigation signal corresponding to the presence of the at least one key.

14. The system of claim 1, wherein the content on the server further comprises user designated information.

15. The system of claim 14, wherein the system further comprises:
   (e) a database for storing records corresponding to the user designated information; and
   (f) means for retrieving a record from the database and, based upon the retrieved record, generating at least one signal corresponding to the retrieved user designated information.

16. The system of claim 14, wherein the user designated information corresponds to the location of additional content.

17. The system of claim 14, wherein the user designated information corresponds to the navigation commands.

18. The system of claim 14, wherein the telephone further comprises at least one key which corresponds to a selected navigation command and the system further comprises:
   (e) a visually perceptible display having at least one display portion associated with each of the at least one keys; and
   (f) means for displaying, on the visually perceptible display, selected text and/or images corresponding to the user designated information.

19. The system of claim 1, wherein the at least one audible navigation signal is generated by a device comprising a switch in communication with a means for generating an audible navigation signal, whereby actuation of the switch causes the generation of the selected audible navigation signal.

20. The system of claim 19, wherein the selected audible navigation signal is a DTMF tone.

21. The system of claim 19, wherein the audible navigation signal corresponds to a command to navigate through the content in a continuous fashion, a stepped fashion, or a combination thereof.

22. A system for navigating content residing on a server using a telephone, the system comprising:
   (a) a communication network;
   (b) a telephone in communication with the communication network, wherein the telephone comprises means for transmitting an audible signal to the communication network and means for receiving an audible signal from the communication network;
   (c) a server including a database for storing content;
   (d) a navigation device for generating a plurality of DTMF tones in communication with the telephone, the navigation device comprising:
      (i) one or more keys corresponding to navigation commands;
      (ii) a database for storing a unique plurality of DTMF tones corresponding to each of the one or more keys;
      (iii) processing means for, upon operation of a selected one of the one or more keys by a user, performing the steps of:
         1) accessing the database; and
         2) generating audible navigation signals corresponding to the unique plurality of DTMF tones corresponding to the selected key; and
      (iv) means for transmitting the audible navigation signals over the communication network by transmitting the audible navigation signals to the telephone; and
   (e) processing means in communication with the database on the server and the communication network for performing the steps of:
      (i) receiving from the communication network the audible navigation signals;
      (ii) in accordance with the navigation signals, accessing the database for storing content on the server;
      (iii) generating at least one audible content signal corresponding to the content by converting textual content to speech, the at least one audible content signal including audible indications of hyperlinks included in the accessed content; and
      (iv) transmitting over the communication network the at least one audible content signal to the telephone.

23. The device of claim 22, wherein the navigation commands correspond to instructions for accessing the content on the server.

24. The device of claim 22, wherein the communication network supports the HTTP protocol.

25. The device of claim 22, further comprising means for generating a unique plurality of DTMF tones corresponding to the presence of the device and wherein the processing means further comprises means for receiving the DTMF tones corresponding to the presence of the device and means for modifying the database of the navigation device.

26. A system for storing the location of content, a copy of content, or a combination thereof residing on a server using a telephone, the system comprising:
   (a) a communication network supporting the HTTP protocol;
   (b) a telephone in communication with the communication network, wherein the telephone comprises means for transmitting at least one audible storage signal over the communication network;
   (c) a database for storing the location of the content, a copy of the content, or a combination thereof, and
   (d) processing means in communication with the database and the communication network for performing the steps of:
      (i) generating at least one audible content signal corresponding to the content by converting textual content to speech, the at least one audible content signal including audible indications of hyperlinks included in the accessed content;
      (ii) receiving the at least one audible storage signal from the communication network; and
      (iii) in accordance with the storage signal, storing the location of the content, a copy of the content, or a combination thereof in the database.

27. The system of claim 26, wherein the audible storage signal is a DTMF tone.

28. The system of claim 26, wherein the telephone further comprises means for transmitting at least one audible access signal over the communication network and the processing means further comprises means for receiving from the communication network the at least one audible access signal and means for, in accordance with the at least one audible access signal, retrieving the content information from the database, generating signals corresponding to the retrieved content, and transmitting the signals to the telephone over the communication network.

29. A system for creating content using a telephone, the system comprising:
(a) a communication network supporting the HTTP protocol;
(b) a telephone in communication with the communication network, wherein the telephone comprises means for transmitting at least one audible content creation signal over the communication network;
(c) a database for storing content; and
(d) processing means in communication with the communication network and the database for performing the steps of:
  (i) receiving the at least one audible content creation signal from the communication network, the content creation signal including indications of hyperlinks in the content; and
  (ii) in accordance with the content creation signal, creating content accessible to users on the communication network and storing the created content in the database.

30. The system of claim 29, wherein the audible content creation signal is a DTMF tone.

31. The system of claim 29, wherein the created content comprises digitized vocal information.

32. The system of claim 29, wherein the telephone further comprises means for transmitting at least one audible content editing signal over the communication network and wherein the processing means further comprises means for receiving the at least one audible content editing signal from the communication network and for modifying the database.

* * * * *